US011088742B2

(12) United States Patent
Min et al.

(10) Patent No.: US 11,088,742 B2
(45) Date of Patent: Aug. 10, 2021

(54) ELECTRONIC DEVICE FOR PERFORMING BEAMFORMING IN WIRELESS COMMUNICATION SYSTEM AND METHOD THEREFOR

(71) Applicant: Samsung Electronics Co., Ltd., Suwon-si (KR)

(72) Inventors: Hyun Kee Min, Sangju-si (KR); Sun Key Lee, Seongnam-si (KR); Jung Hun Lee, Suwon-si (KR); Tae Hun Lim, Gwacheon-si (KR); Min Whoa Hong, Suwon-si (KR); Choun Jong Nam, Yongin-si (KR); Sung Hee Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/733,189

(22) PCT Filed: Jul. 27, 2018

(86) PCT No.: PCT/KR2018/008567
§ 371 (c)(1),
(2) Date: Jun. 5, 2020

(87) PCT Pub. No.: WO2019/112136
PCT Pub. Date: Jun. 13, 2019

(65) Prior Publication Data
US 2021/0105051 A1 Apr. 8, 2021

(30) Foreign Application Priority Data
Dec. 6, 2017 (KR) .................. 10-2017-0167052

(51) Int. Cl.
*H04B 7/06* (2006.01)

(52) U.S. Cl.
CPC .................. *H04B 7/0617* (2013.01)

(58) Field of Classification Search
CPC ..... H04W 88/06; H04W 4/023; H04W 64/00; H04W 76/14; H04W 76/15; H04B 7/0617
See application file for complete search history.

(56) References Cited

U.S. PATENT DOCUMENTS

| 9,629,122 B2 | 4/2017 | Yoon et al. |
| 9,992,673 B2 | 6/2018 | Arkko et al. |
(Continued)

FOREIGN PATENT DOCUMENTS

| JP | 2016-144194 A | 8/2016 |
| JP | 2017-168922 A | 9/2017 |
(Continued)

OTHER PUBLICATIONS

International Search Report and Written Opinion of the International Searching Authority in connection with International Application No. PCT/KR2018/008567 dated Oct. 29, 2018, 11 pages.

*Primary Examiner* — David S Huang

(57) ABSTRACT

Disclosed is an electronic device comprising: a touch screen display; a battery; a plurality of antenna elements arranged in order to perform beamforming for directional wireless communication; a first wireless communication circuit configured to provide, through the antenna elements, first wireless communication having a first coverage; a second wireless communication circuit configured to provide second wireless communication having a second coverage greater than the first coverage; and a processor connected to the display, the battery, the first wireless communication circuit, and the second wireless communication circuit, wherein the processor stores instructions for determining whether an external device is close to the electronic device by using the first wireless communication circuit, enabling at least one antenna element, rather than all the antenna elements, (Continued)

among the plurality of antenna elements, and transmitting data to the external device by using the second wireless communication circuit and the enabled at least one antenna element.

15 Claims, 17 Drawing Sheets

(56) References Cited

U.S. PATENT DOCUMENTS

| | | |
|---|---|---|
| 10,098,045 B2 | 10/2018 | Takahashi et al. |
| 2011/0199918 A1 | 8/2011 | Sampath et al. |
| 2014/0171027 A1 | 6/2014 | Arkko et al. |
| 2016/0014722 A1 | 1/2016 | Yoon et al. |
| 2016/0178560 A1* | 6/2016 | Elder ................ G01N 27/3273 205/792 |
| 2016/0191133 A1 | 6/2016 | Noh et al. |
| 2016/0277976 A1 | 9/2016 | Takahashi et al. |
| 2017/0201303 A9 | 7/2017 | Noh et al. |
| 2019/0059004 A1 | 2/2019 | Norita et al. |
| 2019/0116627 A1 | 4/2019 | Min et al. |
| 2019/0123938 A1 | 4/2019 | Min et al. |

FOREIGN PATENT DOCUMENTS

| | | |
|---|---|---|
| KR | 10-2014-0090495 A | 7/2014 |
| KR | 10-2016-0008378 A | 1/2016 |
| KR | 10-1729858 B1 | 4/2017 |
| KR | 10-2019-0043017 A | 4/2019 |
| KR | 10-2019-0043765 A | 4/2019 |

* cited by examiner

ELECTRONIC DEVICE FOR PERFORMING BEAMFORMING IN WIRELESS COMMUNICATION SYSTEM AND METHOD THEREFOR

CROSS-REFERENCE TO RELATED APPLICATIONS

This application is a 371 National Stage of International Application No. PCT/KR2018/008567, filed Jul. 27, 2018, which claims priority to Korean Patent Application No. 10-2017-0167052, filed Dec. 6, 2017, the disclosures of which are herein incorporated by reference in their entirety.

BACKGROUND

1. Field

Various embodiments disclosed herein relate to beamforming technology of a wireless communication system.

2. Description of Related Art

Wireless communication systems have evolved to support higher data rates to meet ever-increasing traffic demands of wireless data. Recently, 5G systems or Institute of Electrical and Electronics Engineers (IEEE) 802.11ad wireless gigabit alliance (WiGig) systems may support transmission and reception of signals of frequencies in the mmWave band higher than a conventional art to accommodate explosive data traffic, drastically increase a transmission rate per user, accommodate the number of connected electronic devices which has increased dramatically and achieve low end-to-end latency and high energy efficiency.

The mmWave generally refers to an ultra-high frequency of 30 GHz to 300 GHz, and when using such an ultra-high frequency, transmit/receive power is concentrated in a narrow space as the propagation path loss is seriously caused, thus requiring application of beamforming technology that increases an antenna transmission/reception efficiency.

SUMMARY

In WLAN systems using the 2.4 GHz and 5 GHz bands, an antenna mounting space is insufficient due to the mounting of antennas in the unit of centimeter, thus making it difficult to precisely adjust a beam width and a beam direction even when beamforming is applied.

Because signals in the mmWave band (e.g., 60 GHz) have stronger straightness compared to those in 2.4 GHz and 5 GHz, and path loss is very large due to frequency characteristics, a 60 GHz system using the mmWave band may mount a large number of antennas to apply beamforming technique to resolve the problem.

To form a beam pattern for connection with a target device, a beam training process needs to be performed but it may be inefficient to go through all of the beam training processes because a required beam pattern may be simple for a specific event or situation.

Various embodiments disclosed in the disclosure disclose an electronic device and a method therefor for efficiently performing beamforming by reflecting a specific event or state of the electronic device.

An electronic device according to various embodiments disclosed in the disclosure includes a housing, a wireless communication circuit including a non-directional first wireless communication circuit having a first frequency and a first coverage and a directional second wireless communication circuit having a second frequency higher than the first frequency and a second coverage larger than the first coverage as at least one wireless communication circuit located inside the housing and connected to the housing, at least one processor operatively connected to the wireless communication circuit, and a memory operatively connected to the processor. The instructions may cause, when executed by the processor, the processor to acquire an event associated with the first wireless communication circuit, set a beam pattern based on the event, and perform a second wireless communication connection with an external device through the second wireless communication circuit and fixedly use the set beam pattern in the second wireless communication connection.

According to various embodiments disclosed herein, an electronic device includes a housing, a touch screen display exposed through the housing, a battery, a plurality of antenna elements arranged for beamforming for a directional wireless communication, a first wireless communication circuit that provides first wireless communication with a first coverage through the antenna elements, a second wireless communication circuit that provides a second wireless communication with a second coverage smaller than the first coverage, a processor disposed inside the housing and operatively connected to the display, the battery, the first wireless communication circuit and the second wireless communication circuit, and a memory disposed inside the housing and operatively connected to the processor. The instructions may cause, when executed by the processor, the processor to determine whether an external device is in proximity to the electronic device using the first wireless communication circuit, enable at least one antenna element which is not all of the plurality of antenna elements, and transmit data to the external device using the second wireless communication circuit and the enabled at least one antenna element.

According to various embodiments disclosed herein, the electronic device may perform efficient beamforming by reflecting a specific event or a current state.

According to various embodiments disclosed herein, the electronic device may efficiently perform a connection between devices by reflecting a user's intention.

In addition, various effects may be provided that are directly or indirectly understood through the disclosure.

BRIEF DESCRIPTION OF THE DRAWINGS

In the description of the drawings, the same or similar reference numerals may be used for the same or similar components.

DETAILED DESCRIPTION

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure.

Figure 1:
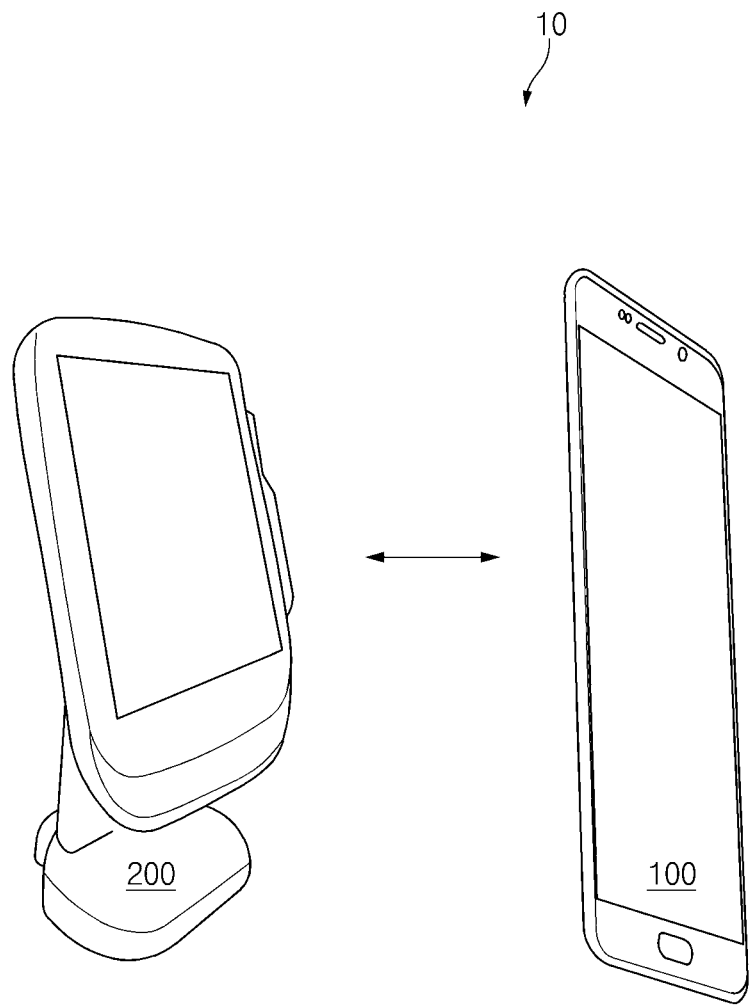
FIG. 1 illustrates a network environment of an electronic device according to an embodiment.

FIG. 1 illustrates a network environment of an electronic device according to an embodiment.

According to an embodiment, an electronic device 100 may perform peer-to-peer (P2P) communication with an external device 200 (a peer device) in a network environment 1000.

According to an embodiment, the electronic device 100 may transmit or receive data through wireless communication with the external device 200. The electronic device 100 may also receive power from the external device 200. For example, the electronic device 100 may charge a battery with power received from the external device 200. To this end, the electronic device 100 may include a battery.

According to an embodiment, the electronic device 100 may be, for example, a smart phone. According to an embodiment, the electronic device 100 may support wireless charging. However, the disclosure is not limited thereto, and the electronic device 100 may include various types of user terminals.

According to an embodiment, the external device 200 may transmit or receive data to or from the electronic device 100 through wireless communication. The external device 200 may supply power to the electronic device 100. For example, the external device 200 may be physically coupled to the electronic device 100 through a housing 101 of the electronic device 100. For example, the external device 200 may be detached/attached from/to an outer surface of the electronic device 100 by its mechanical structure. According to an embodiment of the disclosure, the external device 200 may be detached/attached from/to the electronic device 100 by a magnet included in the external device 200. The external device 200 may be referred to as a power transfer device of the electronic device 100.

According to an embodiment, the electronic device 100 and the external device 200 may support a plurality of communication methods. For example, the electronic device 100 and the external device 200 may support proximity communication and short range wireless communication other than the proximity communication. The electronic device 100 may transmit or receive a signal through proximity communication with the external device 200. The proximity communication scheme may be a communication scheme using a coil. The proximity communication scheme may be a communication scheme using electromagnetic induction or resonance, for example, a magnetic secure transmission (MST) scheme or a near field communication (NFC) scheme. The short range communication scheme may be wireless communication with short coverage, such as Bluetooth and Wi-Fi Direct.

According to an embodiment, the electronic device 100 to the external device 200 may perform mmWave band communication (e.g., 60 GHz). For example, peer-to-peer communication may be performed in an unlicensed band or a licensed band as an mmWave band. For example, to transmit and receive signals in an unlicensed band, the electronic device 100 to the external device 200 may support the IEEE 802.11ad protocol. For another example, to transmit and receive signals in a licensed band, the electronic device 100 to the external device 200 may support cellular communication such as 3GPP. In addition, the electronic device 100 may transmit and receive signals according to various communication schemes that support the mmWave band.

Figure 2:
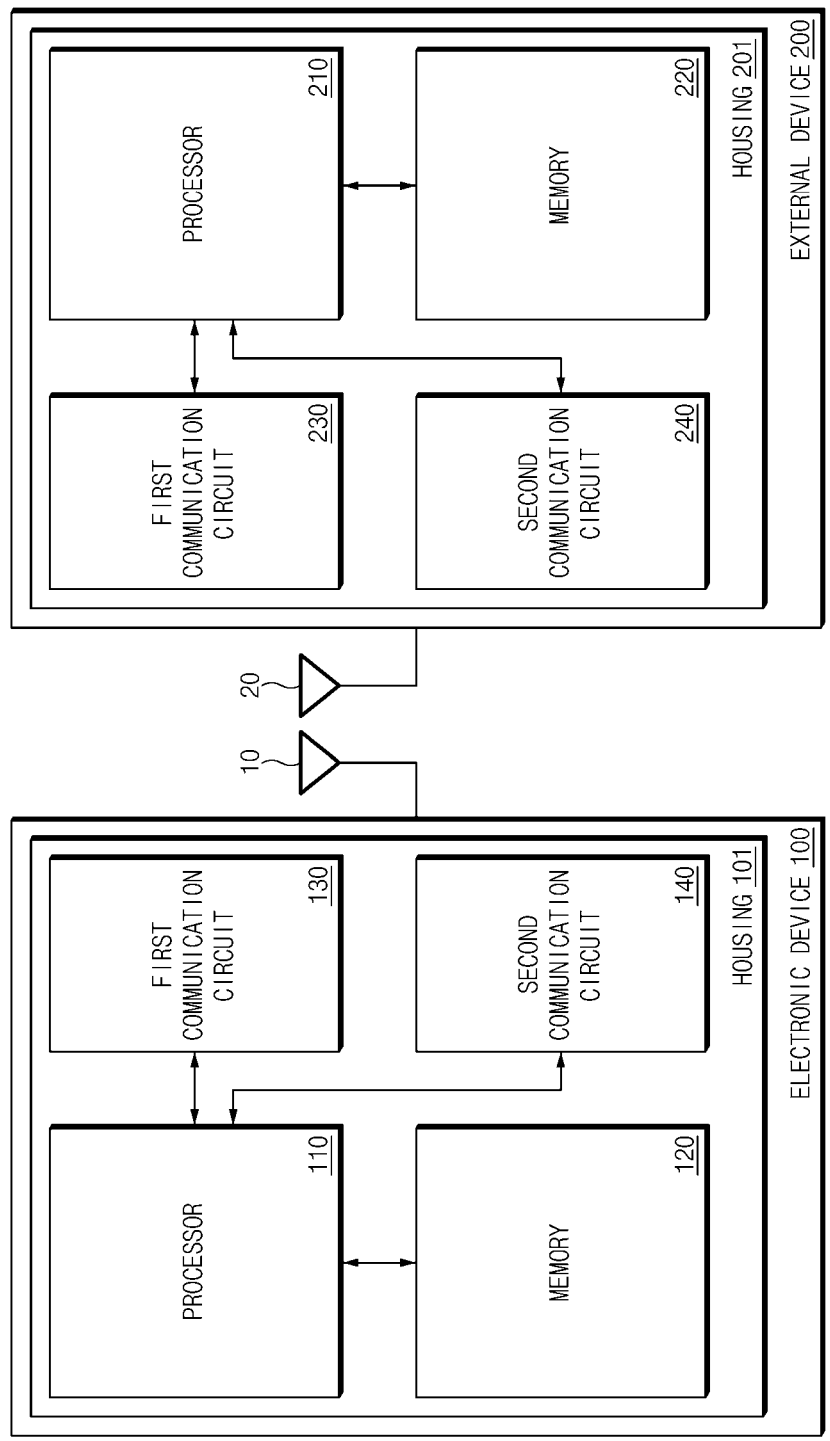
FIG. 2 is a block diagram illustrating configurations of an electronic device and an external electronic device, according to an embodiment.

FIG. 2 is a block diagram illustrating configurations of an electronic device and an external device, according to an embodiment.

Referring to FIG. 2, the electronic device 100 (e.g., the electronic device 100 of FIG. 1) may include a first communication circuit 130 and a second communication circuit 140 for wireless communication with the external device 200 (e.g., the external device 200 of FIG. 1). In addition, a processor 110 and a memory 120 may be included, and various modifications for performing various embodiments disclosed herein may be possible.

According to an embodiment, the first communication circuit 130 may provide first network communication with a first frequency and a first coverage. According to an embodiment, the first communication circuit 130 may provide omni-directional or non-directional communication. The first communication circuit 130 may provide proximity communication or short range communication. The first communication circuit 130 may provide proximity communication. For example, the first communication circuit 130 may provide communication of magnetic secure transmission (MST) and/or near field communication (NFC) scheme, and/or provide wireless charging. To this end, the first communication circuit 130 may include different coils for MST, NFC, or wireless charging (e.g., wireless power charging (WPC)), power matters alliance (PMA) or the like). According to an embodiment, the first communication circuit 130 may provide short range wireless communication. The short range wireless communication may be a wireless communication scheme within a short coverage, for example, Bluetooth or wireless-fidelity (Wi-Fi) direct. According to an embodiment, the Wi-Fi Direct may support transmission and reception of signals in the 2.4 GHz band or the 5 GHz band.

According to an embodiment, the electronic device 100 may receive power through the first communication circuit 130 and charge a battery. For example, when the external device 200 approach the electronic device 100 within a certain distance, the battery of the electronic device 100 may be charged by electromagnetic induction or resonance between a transmission coils of the external device 200 and a reception coil of the electronic device 100.

According to an embodiment, the second communication circuit 140 may have a second frequency higher than the first frequency. According to an embodiment, the second communication circuit 140 may perform second network communication for transmitting and receiving a signal in an ultra-high frequency band. For example, the second communication circuit 140 may transmit or receive a signal in the mmWave band. The second communication circuit 140 may transmit or receive a large-capacity signal or user data. According to an embodiment, the mmWave band may include at least a part of a frequency band of 25 GHz to 100 GHz. For example, the mmWave band may be a 60 GHz frequency band. In the following description, the second network communication may be referred to as 60 GHz communication.

According to an embodiment, the second communication circuit 140 may perform second network communication having the second coverage. According to an embodiment, the second coverage may be smaller than the first coverage. While the second communication circuit 140 provides the proximity communication or short range communication, the first coverage may be smaller than the second coverage. According to an embodiment, the second coverage may be larger than the first coverage. According to an embodiment, while the first communication circuit 130 provides short range wireless communication, the second coverage may be larger than the first coverage.

According to an embodiment, the first communication circuit 130 may be non-directional or omni-directional, and the second communication circuit 140 may be directional. The second communication circuit 140 may form a beam to have a specific direction.

According to an embodiment, the processor 110 may be operatively connected to the first communication circuit 130 and the second communication circuit 140, and control the first communication circuit 130 and the second communication circuit 140. According to an embodiment, the processor 110 may execute instructions stored in the memory 120.

According to an embodiment, the memory 120 may be operatively connected to the processor 110. The memory 120 may store instructions for performing embodiments disclosed herein. In addition, the memory 120 may store information such as antenna-related parameters according to an event.

According to an embodiment, the components, such as the processor 110, the memory 120, the first communication circuit 130, and the second communication circuit 140, may be disposed inside the housing 101. The housing 101 of the electronic device 100 may be understood as a frame surrounding the electronic device 100.

According to an embodiment, the external device 200 may be physically coupled to the electronic device 100 through the housing 101 of the electronic device 100, and wirelessly supply power to the electronic device 100.

According to an embodiment, the external device 200 may include a housing 201, a processor 210, a memory 220, a first communication circuit 230 and a second communication circuit 240. According to an embodiment, the external device 200 may be the same or similar device to the electronic device 100. For example, the housing 201, the processor 210, the memory 220, the first communication circuit 230 and the second communication circuit 240 in the external device 200 may be the same as or similar to the housing 101, the processor 110, the memory 120, the first communication circuit 130 and the second communication circuit 140 in the electronic device 100.

According to an embodiment, the external device 200 may be a power supply device that supplies power to the electronic device 100. To this end, the first communication circuit 230 includes a transmission coil, and may supply power to the electronic device 100 through the transmission coil. To supply power, the external device 200 may include a power generation circuit. According to an embodiment, the external device 200 may be coupled to the electronic device 100 through the housing 201.

According to an embodiment, the electronic device 100 may include an antenna 10 for wireless communication with the external device 200. The external device 200 may include an antenna 20 for communication with the electronic device 100. According to an embodiment, the antenna 10 and the antenna 20 may be directional, non-directional or omni-directional antennas.

According to an embodiment, the antenna 10 and the antenna 20 may be antennas for performing communication through a first network or a second network. The antenna 10 and the antenna 20 may be, for example, antennas capable of transmitting and receiving signals in a first frequency band or a second frequency band. According to an embodiment, the antenna 10 and/or the antenna 20 may be an array antenna. The antenna 10 and/or the antenna 20 may be implemented with an antenna module.

According to an embodiment, an electronic device (e.g., the electronic device 100 of FIG. 2) includes a housing (e.g., the housing 101 of FIG. 2), a wireless communication circuit including a non-directional first wireless communication circuit (e.g., the first communication circuit 130 of FIG. 2) having a first frequency and a first coverage and a directional second wireless communication circuit (e.g., the second communication circuit 140 of FIG. 2) having a second frequency higher than the first frequency and a second coverage larger than the first coverage as at least one wireless communication circuit (e.g., the first communication circuit 130 or the second communication circuit 140 of FIG. 2) located inside the housing and connected to the housing, at least one processor (e.g., the processor 110 of FIG. 2) operatively connected to the wireless communication circuit, and a memory (e.g., the memory 120 of FIG. 2) operatively connected to the processor to store instructions.

According to an embodiment, the instructions may cause, when executed by the processor, the processor to acquire an event associated with the first wireless communication circuit, set a beam pattern based on the event, and perform a second wireless communication connection with an external device (e.g., the external device 200 of FIG. 2) through the second wireless communication circuit and fixedly use the set beam pattern in the second wireless communication connection.

According to an embodiment, the electronic device may further include at least one antenna associated with the second wireless communication circuit, and the instructions may cause, when executed by the processor, the processor to determine parameters related to the antenna based on the event.

According to an embodiment, the parameters related to the antenna may include at least one of the number of active antennas of the at least one antenna, an active antenna, a sector identifier or antenna transmit power.

According to an embodiment, the instructions may cause, when executed by the processor, the processor to perform a first wireless communication connection with the external device through the first wireless communication circuit, and acquire information on the external device through the first wireless communication circuit.

According to an embodiment, the instructions may cause, when executed by the processor, the processor to determine parameters related to the antenna based on the information on the external device.

According to an embodiment, the information on the external device may include a hardware identifier of the external device According to an embodiment, the first wireless communication circuit may support magnetic secure transmission (MST), near field communication (NFC) or wireless charging.

According to an embodiment, the event may include NFC tagging or recognition of wireless charging.

According to an embodiment, the instructions may cause, when executed by the processor, the processor to perform a sector level sweep (SLS) operation for the second wireless communication connection with the external device.

According to an embodiment, the instructions may cause, when executed by the processor, the processor to fixedly use the beam pattern during the SLS operation.

According to an embodiment, the beam pattern which is used is one beam pattern

According to an embodiment, the one beam pattern corresponds to one sector.

According to an embodiment, an electronic device (e.g., the electronic device 100 of FIG. 2) may include a housing (e.g., the housing 101 of FIG. 2), a touch screen display exposed through the housing, a battery, a plurality of antenna elements (e.g., the antenna elements 11 and 12 of FIG. 3) arranged for beamforming for directional wireless communication, a first wireless communication circuit (e.g., the first communication circuit 130 of FIG. 2) that provides first wireless communication with a first coverage through the antenna elements, a second wireless communication circuit (e.g., the second communication circuit 140 of FIG. 2) that provides second wireless communication with a second coverage lager than the first coverage, a processor (e.g., the processor 110 of FIG. 2) disposed inside the housing and operatively connected to the display, the battery, the first wireless communication circuit and the second wireless communication circuit, and a memory (e.g., the memory 120 of FIG. 2) disposed inside the housing and operatively connected to the processor.

The instructions may cause, when executed by the processor, the processor to determine whether an external device (e.g., the external device 200 of FIG. 2) is in proximity to the electronic device using the first wireless communication circuit, and enable at least one antenna element which is not all of the plurality of antenna elements.

According to an embodiment, the instructions may cause, when executed by the processor, the processor to transmit data to the external device using the second wireless communication circuit and the enabled at least one antenna element.

According to an embodiment, the enabled antenna element may provide directional- or non-directional wireless communication According to an embodiment, the second wireless communication circuit may provide a signal of a frequency of from 25 GHz to 100 GHz.

According to an embodiment, the frequency includes 60 GHz.

According to an embodiment, the first wireless communication circuit may support a near field communication (NFC) protocol.

According to an embodiment, the instructions may cause, when executed by the processor, the processor to determine whether the external device is in proximity to the electronic device using a reader mode of the NFC protocol.

According to an embodiment, the first wireless communication circuit may provide wireless charging of the battery.

According to an embodiment, the instructions may cause, when executed by the processor, the processor to determine a distance between the electronic device and the external device using the first wireless communication circuit, and adjust the number of active antenna elements based at least partially on the determined distance.

Figure 3:
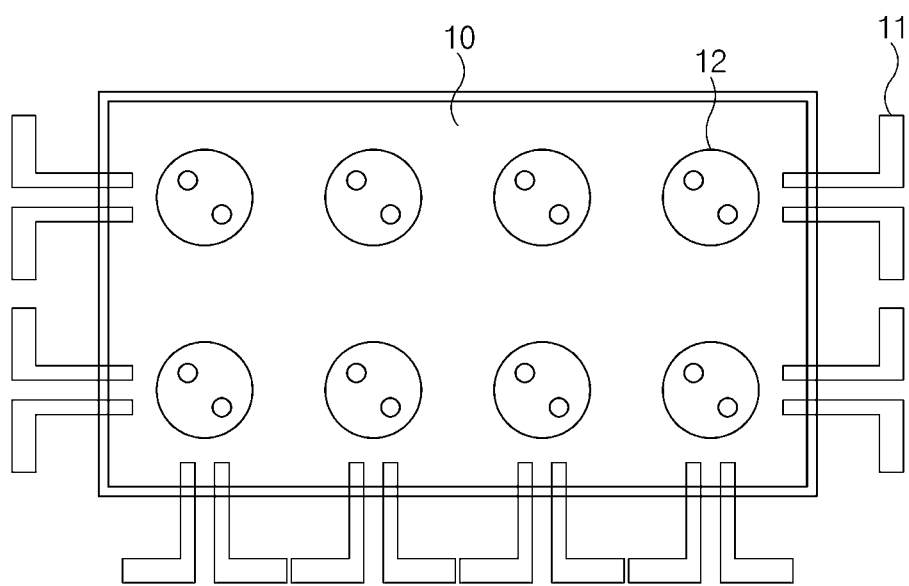
FIG. 3 illustrates an antenna of an electronic device according to an embodiment.

FIG. 3 illustrates an antenna of an electronic device according to an embodiment.

According to an embodiment, the antenna 10 (e.g., the antenna 10 of FIG. 2) may be configured to transmit and receive an ultra-high frequency, for example, the mmWave band (e.g., 60 GHz). According to an embodiment, the antenna 10 may be implemented with an array antenna, and may include a plurality of patch antennas 11 and a plurality of dipole antennas 12.

Referring to FIG. 3, the antenna 10 may include the patch antenna 11 for boresight and the antenna 12 for beamforming in a side direction. For example, the antenna 10 may include 16 patch antennas 11 and 16 dipole antennas 12. In addition, the configuration of the antenna 10 may be implemented in various forms.

According to an embodiment, an electronic device (e.g., the electronic device 100 of FIG. 1 or the electronic device 100 of FIG. 2) may apply antenna-related parameters for each antenna and perform beamforming.

According to an embodiment, one set of antenna-related parameters may form one beam pattern. The antenna-related parameters in the one set may be referred to as a phase vector. For example, the electronic device may determine whether to activate an antenna and/or apply a phase shift value for each antenna using a phase vector and generate a beam pattern.

Although the antenna 10 is illustrated in FIG. 3, the description with reference to FIG. 3 may be applied to the antenna 20 of FIG. 2.

Figure 4B:
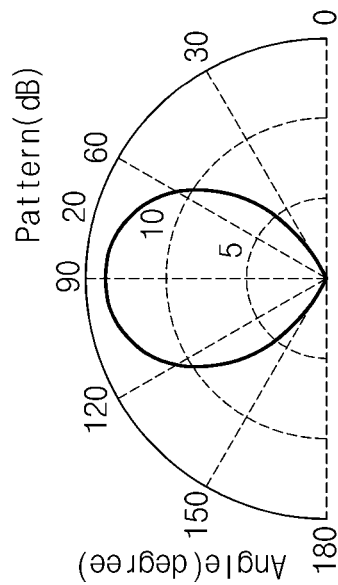
FIGS. 4A and 4B show an examples of a beam pattern of the antenna of FIG. 3 in two dimensions.
Figure 4A:
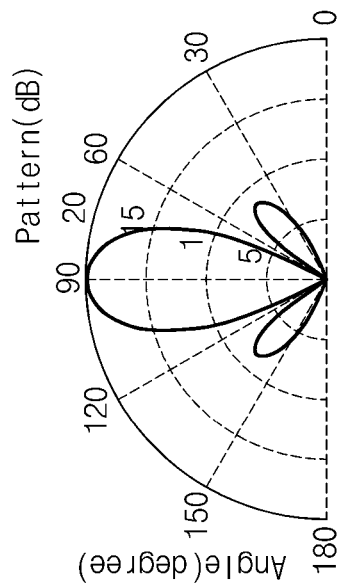

FIGS. 4A and 4B show examples of a beam pattern of the antenna of FIG. 3 in two dimensions.

Referring to FIGS. 4A and 4B, 0 degrees is a right direction, 90 degrees is a front (or aiming direction) and 180 degrees is a left direction.

FIGS. 4A and 4B show beam patterns according to antenna-related parameters applied to an antenna (e.g., the antenna 10 of FIG. 3). FIG. 4A shows a case in which a phase shift value of 0 is applied to a patch antenna in the aiming direction, and the number of active antennas is set to four, and FIG. 4B shows a case in which the phase shift value of 0 is applied and the number of active antennas is set to two.

Referring to FIGS. 4A and 4B, when the number of active antennas is reduced, a beam width may be increased and coverage may be shortened. Such a beam pattern with an increased beam width and a shortened coverage may be referred to as a first beam pattern in the following description.

According to an embodiment, an operation mode of the electronic device using the first beam pattern may be referred to as a proximity mode in the following description. For example, electronic devices located in proximity to each other may not need fine adjustment of the beam direction and may use a small number of active antennas, thus reducing power consumption. In the following embodiment, a process of forming a beam pattern may be simplified by defining an electronic device in a proximity mode.

According to an embodiment, the electronic device may have one set or a plurality of sets of antenna-related parameters forming the first beam pattern. The electronic device may store antenna-related parameters forming the first beam pattern in a memory (e.g., the memory 120 of FIG. 2).

Hereinafter, a connection operation for communication between electronic devices will be described. Specifically, a process for performing a connection between two or more electronic devices in a 2.4 GHz and 5 GHz wireless local access network (WLAN) (or Wi-Fi) and a 60 GHz WiGig system compliant with the 802.11 standard protocol will be described. It should be noted that the process for connection between various electronic devices may be applied to various embodiments disclosed herein.

A process of setting up a link between electronic devices may include scan, find, service discovery, group formation, provision, and (P) BSS ((personal) basic service set) setup operation.

In a scan phase, an electronic device (e.g., the electronic device 100) may scan other electronic devices existing in the vicinity. The electronic device may scan all channels.

In a discovery phase, the electronic device may find a peer device (e.g., the external device 200) to connect in its surroundings while randomly switching between a listen state and a search state. The electronic device may transmit a probe request frame and wait for a response from the peer device in the search state. The listen state may be a state in which the electronic device receives the probe request frame, and when receiving the probe request frame, the electronic device may transmit a probe response frame to the peer device. The two electronic devices may discover each other when one electronic device is in the search state and the other is in a listen state in the same channel.

According to an embodiment, in the service discovery phase, the two electronic devices may exchange a service discovery query and a service discovery response. Through this, the electronic device may identify mutual compatibility of a service.

According to an embodiment, in the group formation phase, the two electronic devices may determine the role of one of a group owner (GO) or a group client (GC).

According to an embodiment, in the provision phase, the electronic device may generate a private key that may be used for security.

According to an embodiment, in the (P) BSS setup phase, a secured connection may be completed using the private key generated in the provision phase.

Figure 5:
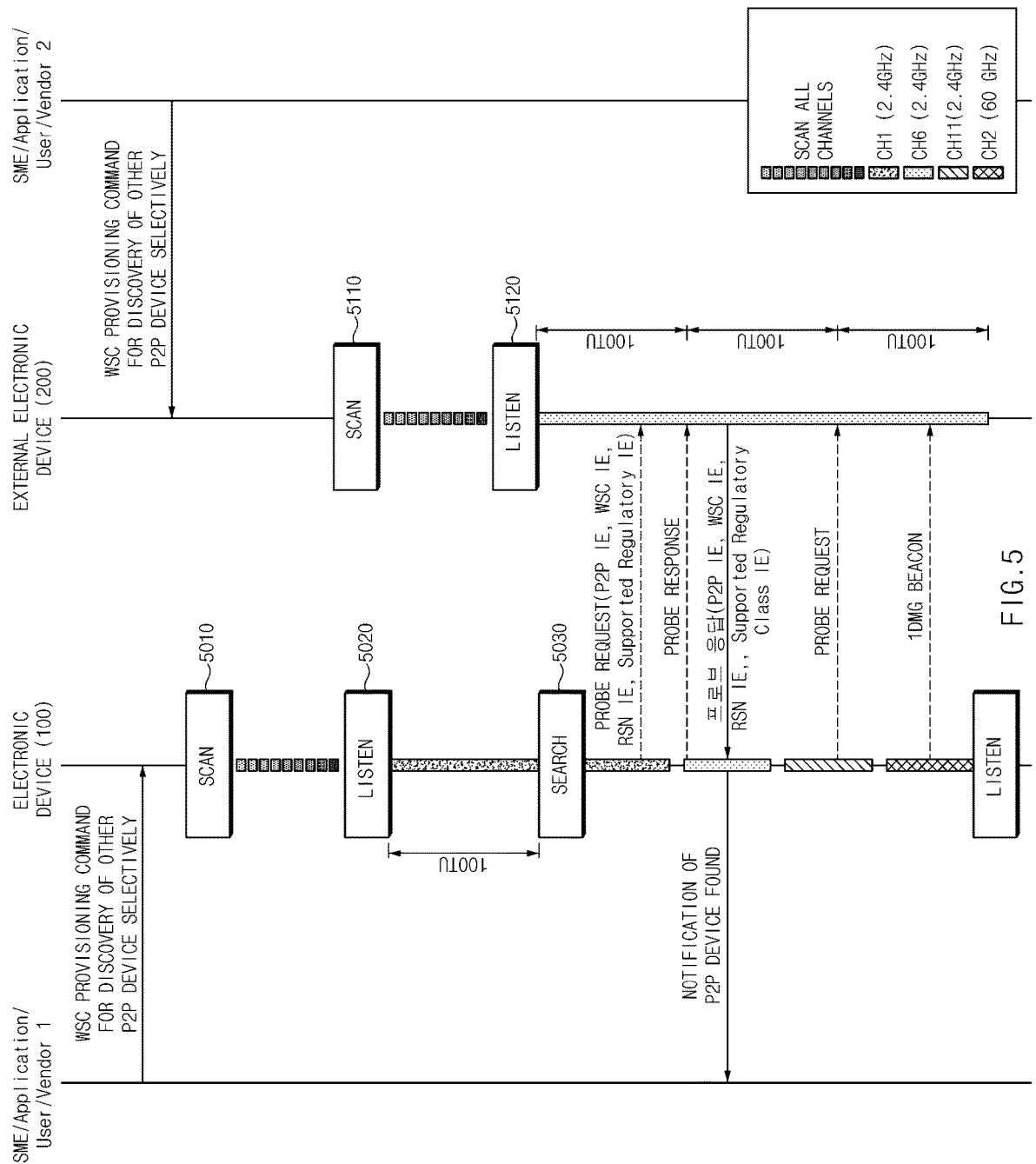
FIG. 5 shows a P2P connection operation according to an embodiment.

FIG. 5 illustrates a P2P connection operation according to an embodiment.

FIG. 5 is a flowchart of a P2P connection operation of the electronic device 100 (e.g., the electronic device 100 of FIG. 1 or 2) and the external device 200 (e.g., the external device 200 of FIG. 1 or 2). Such a connection operation may be performed through the second communication circuits 140 and 240 of FIG. 2.

Referring to FIG. 5, the electronic device 100 may perform a scan operation 5010. According to an embodiment, the scan operation may be compliant with the 802.11 protocol. The electronic device 100 may scan all channels.

For example, when the electronic device 100 discovers another electronic device or acquires a Wi-Fi simple configuration (WSC) provisioning command from a station management entity (SME), an application, a user or a vendor, the electronic device 100 may start performing a discovery phase and perform the scan operation 5010.

The electronic device 100 may perform a listen operation 5020 on the channels after performing the scan operation 5010. The electronic device 100 may listen to whether there is transmission of a probe request or a beacon from other electronic devices.

According to an embodiment, when the electronic device 100 does not acquire a probe request or the like from another electronic device through channels (e.g., channel 1 (ch 1)), the electronic device 100 may perform a search operation 5030. The electronic device 100 may perform the search operation 5030 for each channel, and in this case, may transmit a probe request frame or a beacon. For example, the electronic device 100 may transmit a probe request frame through channels in the 2.4 GHz band (e.g., CH 1, CH 6 or CH 11). The electronic device 100 may transmit a beacon through a channel in the 60 GHz band (e.g., CH 2).

According to an embodiment, the probe request frame may include a P2P information element (IE), a WSC IE, a robust security network (RSN) IE, and/or a supported regulatory IE.

Referring to FIG. 5, when the electronic device 100 acquires a probe response to a probe request from the external device 200 through a channel 6 (ch 6), the electronic device 100 may notify an SME, an application, a user or a vendor that a P2P device has been found, and perform the remaining connection operation with the external device 200.

When the external device 200 discovers another electronic device or acquires a Wi-Fi simple configuration (WSC) provisioning command from a station management entity (SME), an application, a user or a vendor, the external device 200 may start performing a discovery process and perform the scan operation 5010.

The external device 200 may perform a listen operation 5120 and acquire a probe request frame through the channel 6 while the electronic device 100 performs the search operation 5030, and transmit a probe response frame in response the probe request frame.

The probe response frame may include a P2P information element (IE), a WSC IE, a robust security network (RSN) IE, and/or a supported regulatory class IE.

Through this, the electronic device 100 and the external device 200 may establish a P2P connection through the channel 6 and transmit and receive signals to and from each other.

Figure 6:
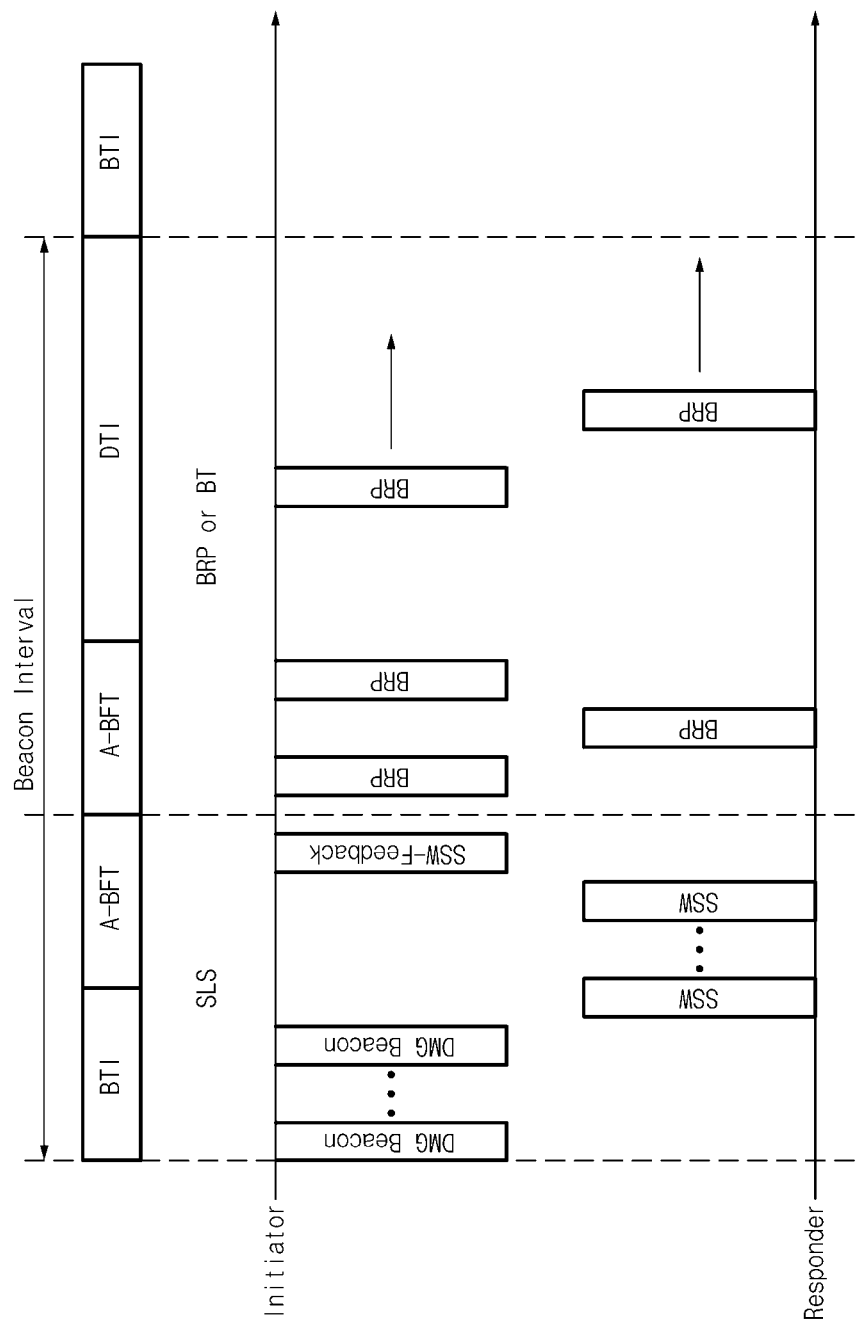
FIG. 6 is a diagram for describing a beamforming training operation according to an embodiment.

FIG. 6 is a diagram for describing a beamforming training operation according to an embodiment.

Referring to FIG. 6, an electronic device (e.g., the electronic device 100 of FIG. 1 or 2) may perform a beamforming training operation according to the IEEE 802.11ad protocol. According to an embodiment, the beamforming training operation may be a connection operation in the mmWave band.

Signals in the mmWave band may have stronger straightness than those in the 2.4 GHz and the 5 GHz, and experience a large path loss due to frequency characteristics, and to resolve this problem, a communication system may have adopted a beamforming technique by mounting a large number of antennas. For example, in the IEEE 802.11ad standard, various beamforming protocols are defined, for example, various beamforming protocols such as a sector level sweep (SLS), a beam refinement protocol (BRP), or a beam tracking (BT) method are defined. The electronic device may selectively use each protocol for connection and/or data communication.

According to an embodiment, the electronic device may perform beamforming training, and the beamforming training may be roughly divided into an SLS phase for setting a sector to transmit and a BRP phase for improving a configuration of an antenna sector.

Referring to FIG. 6, the electronic device may transmit a beacon while changing a beam direction for each sector based on an SLS protocol in a beacon transmission interval (BTI) of an SLS phase within a beacon interval and perform SLS beamforming training using series of sector sweep (SSW) frames during A-BFT (association beamforming training).

When link detection through the SLS protocol is completed, the electronic device may perform the BRP. The electronic device may exchange request-response based frames using the BRP in an announcement transmission interval (ATI). In a data transfer interval (DTI), the electronic device may perform connection using the BRP. When the connection is completed, the electronic device may transmit and receive data, and during transmission and reception of data, additional beam training may be performed using the BT protocol.

Figure 7:
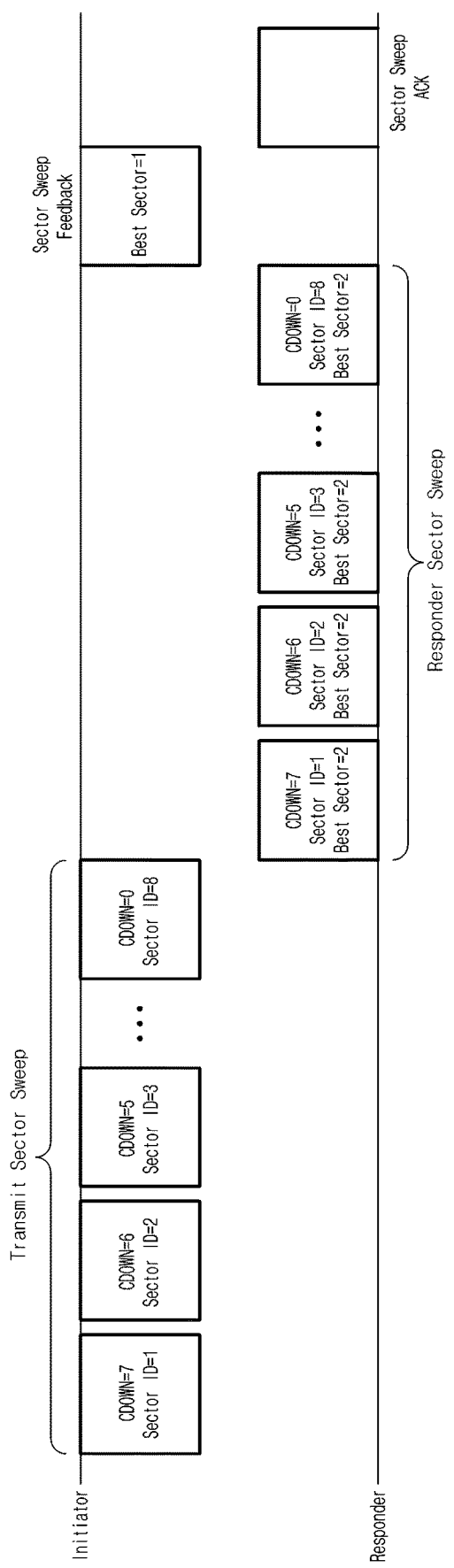
FIG. 7 illustrates an operation in an SLS phase of an electronic device according to an embodiment.

FIG. 7 illustrates an operation in an SLS phase of an electronic device according to an embodiment.

In an SLS operation, an electronic device initiating transmission among electronic devices may be referred to as an initiator, and an electronic device performing transmission secondly after receiving the transmission may be referred to as a responder. Here, the initiator may be, for example, the electronic device 100 of FIG. 5, and the responder may be the external device 200 of FIG. 5.

According to an embodiment, the initiator may consecutively transmit an SSW frame containing the identifier of each sector. In response to this, the responder may select a sector having the highest SNR value based on a signal to noise ratio (SNR) value of the received SSW frame in each case, and perform feedback informing the initiator of a selection result. In this case, the responder may repeatedly transmit the SSW frame including the same feedback for each sector.

According to an embodiment, the initiator receiving the SSW frame including the feedback of the responder may select a sector having the highest SNR value based on the SNR value of the received SSW frame, and perform feedback informing the responder of the selection result.

Through the above process, the initiator and the responder may determine each beamforming sector, and such a process may be performed once more by switching the roles of the initiator and the responder. According to an embodiment, in the SLS process, the electronic device may repeatedly transmit the same packet by performing beam division for sectors for discovery of a peer device. In this case, a link detection time may be long, and power consumption may increase because a large number of antennas need be used.

Figure 8:
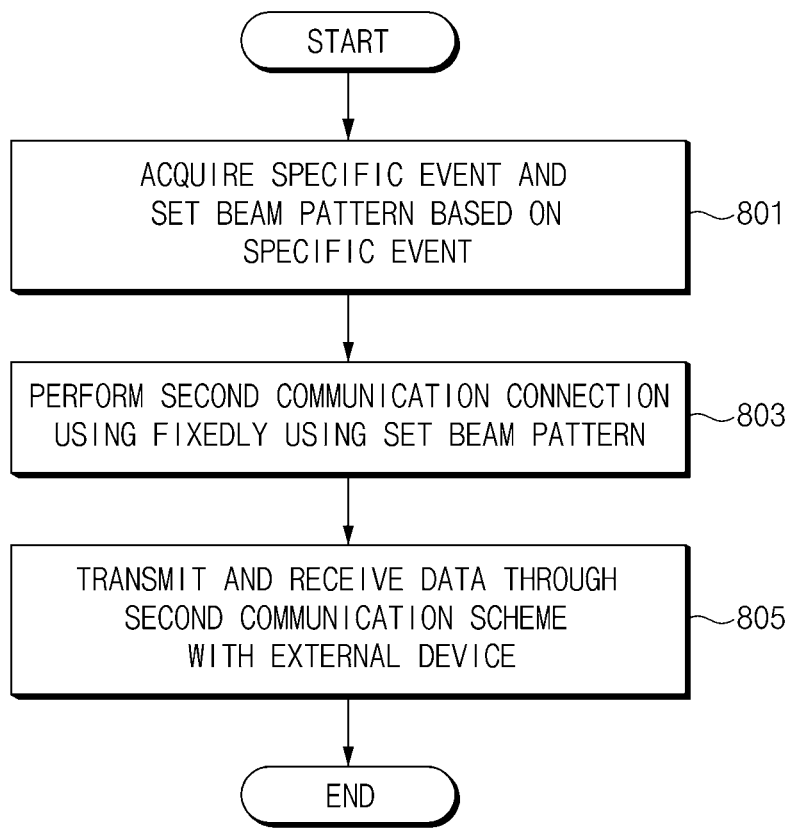
FIG. 8 is a flowchart of a method of performing beamforming of an electronic device according to an embodiment.

FIG. 8 is a flowchart of a method of performing beamforming of an electronic device according to an embodiment.

Operations illustrated in FIG. 8 may be performed by the electronic device 100 or the external device 200 illustrated in FIG. 2. The operations may be implemented with instructions that may be performed (or executed) by the processor 110 of the electronic device 100 or the processor 210 of the external device 200, for example. The instructions may be stored in, for example, a computer recording medium or the electronic device 100 or the external device 200 shown in FIG. 2. Hereinafter, an embodiment will be described collectively as an operation of the electronic device in the description with reference to FIG. 8. Here, the electronic device may be a device as a subject of the following operations. The electronic device may be either the electronic device 100 or the external device 200 of FIG. 2. Further, the external device may be a peer device of the electronic device or an external electronic device. The external device may be either the electronic device 100 or the external device 200 of FIG. 2.

According to an embodiment, the electronic device may determine a beam pattern based on a situation of the electronic device, and may perform a second communication connection with an external device by using the determined beam pattern fixedly. To this end, the electronic device may detect a specific event, perform the second communication connection by fixedly using a specific beam pattern, and transmit or receive data to or from an external device through a second communication scheme. Hereinafter, operations will be described in detail. In the following description, the electronic device may be in a state in which the second communication connection with the external device is not established at the start of operation.

Referring to FIG. 8, in operation 801, the electronic device may acquire a specific event and set a beam pattern based on the specific event. The specific event may be an event preset in the electronic device. The event may be, for example, proximity to an external device, recognition of wireless charging, NFC tagging, a case of being located at a predetermined distance from an external device, a case in which power from the external device satisfies a specific threshold, a case in which an specific application is executed, a case in which a specific input value may be acquired from a user, or a case of operating in a predefined specific mode. For example, the specific event may be recognition of a proximity mode or recognition of a mode of a specific beam direction. According to an embodiment, in connection with various embodiments of the disclosure, one event or a plurality of different specific events may be set in the electronic device.

According to an embodiment, the electronic device may determine the specific event based on a first communication circuit (e.g., the first communication circuit 130 of FIG. 2) or a first communication scheme. For example, the electronic device may detect the specific event based on a proximity communication scheme or a short range communication scheme. For example, the electronic device may recognize proximity (e.g., NFC tagging) of the electronic device to the external device based on a proximity communication scheme, or the proximity of the electronic device to the external device (a received signal strength indicator, RSSI) based on a short range communication scheme.

According to an embodiment, the electronic device may set a beam pattern based on the specific event. The electronic device may determine a beam pattern based on the specific event, and set the beam pattern as a beam pattern for a second communication connection. According to an embodiment, the beam pattern and the specific event may be associated with each other.

In response to acquisition (or detection) of the specific event, the electronic device may perform the second communication connection by fixedly using the beam pattern set in operation 803. In this case, the second communication connection may be performed using a beam pattern fixed through the second communication circuit (e.g., the second communication circuit 140 of FIG. 2).

For example, when performing the second communication connection, the electronic device may set a beam pattern determined based on the specific event. After determining the beam pattern based on the specific event, the electronic device may apply the beam pattern. According to an embodiment, the electronic device may fixedly use the beam pattern determined when performing the second communication connection. The specific event may trigger the second communication connection using the fixed beam pattern, and may influence the determination of the beam pattern.

According to an embodiment, the electronic device may determine an antenna-related parameter for the beam pattern. The antenna-related parameter may include at least one of an active antenna (or whether each antenna is activated), a phase shift value for each antenna, the number of active antennas, or transmit power for each antenna. Applying the beam pattern may mean applying an antenna-related parameter. The antenna-related parameter may be referred to as a phase vector.

According to an embodiment, the specific event and the beam pattern or the antenna-related parameter may be associated with each other. The association relationship may be specified in the electronic device. Alternatively, the event may be associated with the first beam pattern. In this case, the electronic device may determine a specific beam pattern among the first beam patterns.

According to an embodiment, one or a plurality of antenna-related parameter values may be specified in advance for the specific event. In addition, when there are multiple specific events, the antenna-related parameter may be specified by a different value for each event.

Using the beam pattern fixedly may mean using the same antenna-related parameter value for a specific operation. For example, the electronic device may use the same beam pattern while transmitting a frame in the SLS phase of FIGS. 6 to 7.

In operation 805, the electronic device may transmit or receive data to or from an external device through a second communication scheme. When connecting to the external device through the second communication, the electronic device may transmit or receive data to or from the external device through the second communication scheme. The second communication scheme may be, for example, a WiGig communication scheme supporting an mmWave band or a cellular communication scheme.

According to an embodiment, the specific event may be a case in which the electronic device recognizes a proximity state to the external device and in this case, when the beam pattern is used fixedly, the time required to scan the external device may be reduced, thus achieving usability. Hereinafter, an operation of performing beamforming in an electronic device when the electronic device recognizes a proximity state to the external device will be described with reference to FIG. 9.

Figure 9:
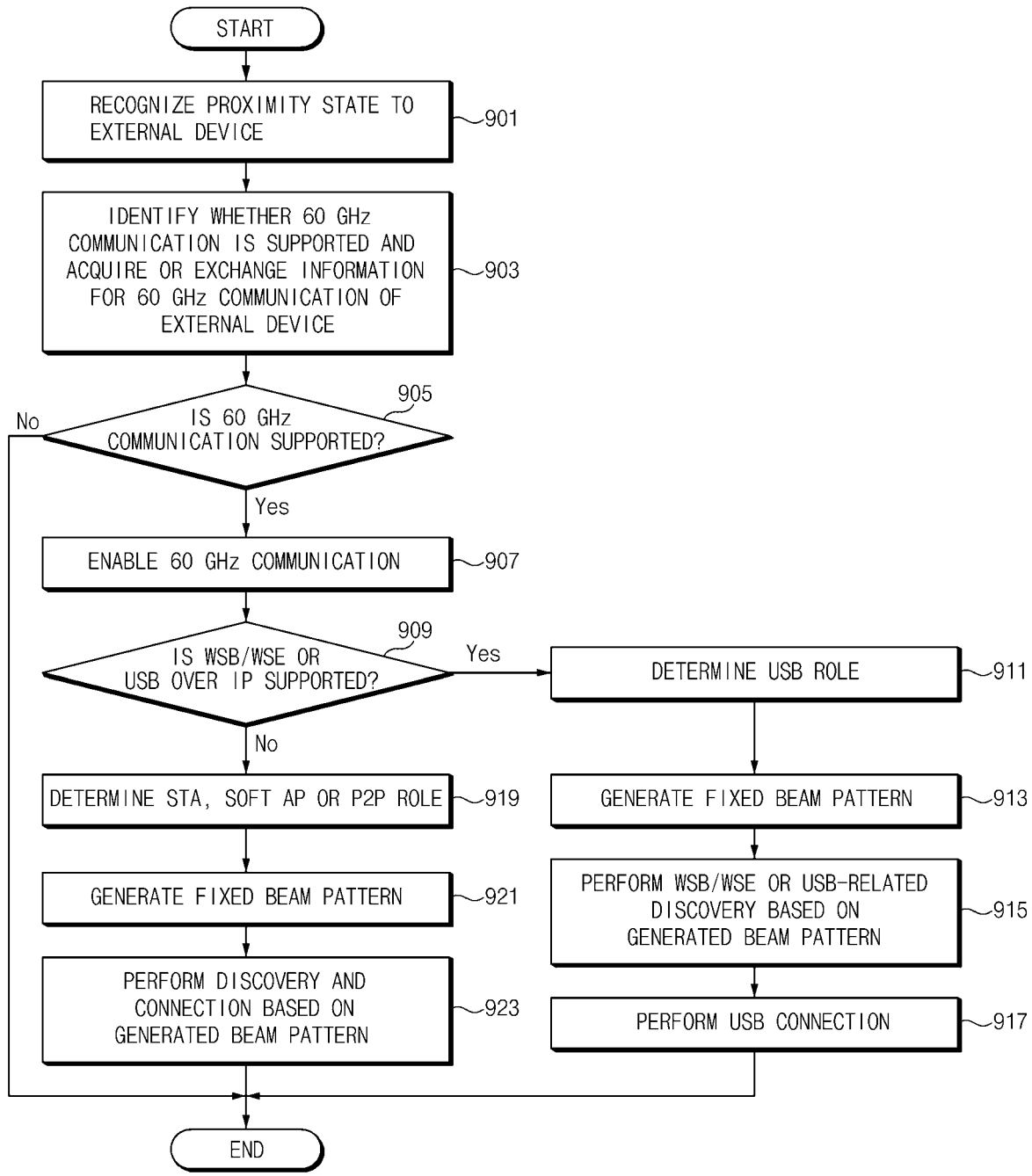
FIG. 9 is a flowchart of a method of performing beamforming in an electronic device according to an embodiment.

FIG. 9 is a flowchart of a method of performing beamforming in an electronic device according to an embodiment.

Operations illustrated in FIG. 9 may be performed by the electronic device 100 or the external device 200 illustrated in FIG. 2. The operations may be implemented with instructions that may be performed (or executed) by the processor 110 of the electronic device 100 or the processor 210 of the external device 200, for example. The instructions may be stored in, for example, a computer recording medium or the electronic device 100 or the external device 200 shown in FIG. 2. Hereinafter, in the description of FIG. 9, an embodiment will be described collectively as an operation of the electronic device. Here, the electronic device may be the electronic device 100 or the external device 200 of FIG. 2. In addition, the external device may be either the electronic device 100 or the external device 200 of FIG. 2 as a peer device of the electronic device.

In operation 901, the electronic device may recognize a proximity state to an external device. The electronic device may recognize the proximity state to the external device through first communication. The first communication may be a short range or proximity communication scheme. For example, the electronic device may recognize NFC tagging or a proximity state to the external device through wireless charging. In this case, the first communication may be NFC communication, wireless charging, or MST communication. As another example, a proximity state to an external device may be recognized using a received signal strength of short range communication. In this case, the first communication may be Bluetooth or Wi-Fi Direct.

In operation 903, the electronic device may acquire information about an external device. For example, the electronic device may determine whether the external device supports second communication through the first communication, and/or acquire or exchange information for the second communication with the external device through the first communication. The information for the second communication with the external device may include at least one of information such as hardware (HW) identification (ID) of the external device or an operation mode supportable by the external device. The information may be acquired through, for example, a vendor specific information element (VSIE).

In operation 905, the electronic device may determine whether the external device supports the second communication. For example, the electronic device may determine whether the external device supports communication in the 60 GHz band.

When the external device supports the second communication, in operation 907, the electronic device may enable the second communication circuit 140 to perform the second communication.

The electronic device may determine roles of the external device and the electronic device before connecting to the external device based on the second communication scheme. To this end, in operation 909, the electronic device may determine whether the external device supports a wireless serial bus (WSB), WiGig serial extension (WSE) or universal serial bus (USB) over Internet protocol (IP) function.

When the function is supported, in operation 911, the electronic device may determine a USB role in a relationship with the external device and in operation 913, generate a beam pattern. When forming the beam pattern, a beam pattern associated with operation 901 may be generated. For example, the electronic device may generate a beam pattern suitable for a proximity state to the external device. Here, the generated beam pattern may be a fixed beam pattern for a specific operation.

In operation 915, the electronic device may perform a WSB, WSE, or USB-related discovery operation based on the generated beam pattern. According to an embodiment, the discovery operation may be a discovery operation according to a second communication protocol. According to an embodiment, the electronic device may use a fixed beam pattern during the SLS operation.

The electronic device may perform discovery of the external device, and in operation 917, perform a USB connection with the external device.

Again, in operation 909, when the external device does not support the function, in operation 919, the electronic device may determine a role of a STA (station), a soft AP (access point), or a P2P.

In operation 921, the electronic device may generate a fixed beam pattern. In operation 923, the electronic device may perform discovery and connection operations based on the beam pattern.

When the connection is performed by proximity between the electronic device and the external device, the electronic device may execute a specific application. For example, a user interface (UI) application that switches a phone environment to a desktop screen may be automatically executed. To this end, the electronic device may include a display. The display may be exposed to the outside through the housing 101 of FIG. 1.

Hereinafter, operations of FIG. 9 will be described through more specific examples. In the following description, the term "first communication" is defined as a proximity communication method used in NFC or wireless charging to distinguish the first communication from communication in the mmWave or the 60 GHz.

Operation 901 of Recognizing the Proximity State

The operation may be an operation for recognizing NFC tagging or wireless charging. When NFC tagging or magnetic induction type wireless charging is performed, an NFC coil or wireless charging coil of the electronic device may be arranged in a straight line with a coil of the external device in a range within several centimeters. In addition, when the wireless charging of the self-resonance method is performed, the proximity state may be recognized (only) when the wireless charging coil and the coil of the external device are arranged in a straight line within several meters. The electronic device may recognize a proximity state to the external device based on the positions of the coils.

The electronic device may recognize the proximity state based on a received signal strength. For example, the electronic device may acquire a signal from the external device according to a short range communication scheme, and recognize a proximity state to the external device based on the received signal strength of the signal.

(b) Operation 903 of Acquiring or Exchanging Information for Second Communication When NFC tagging or wireless charging of the magnetic induction or magnetic resonance scheme is performed, the electronic device may exchange data with the external device at a low-speed. In the case of NFC, data communication at several hundred kbps may be possible, and in this case, the electronic devices may perform exchange until a passphrase of the WLAN and perform a connection. In the case of wireless charging, data exchange of about several kbps may be possible, and wireless charging may be used for output voltage request or the like.

When NFC tagging or wireless charging between the electronic device and the external device is executed, the electronic device may transmit a specified request frame and determine whether the external device supports, for example, 60 GHz communication.

According to an embodiment, when the electronic device is connected to the external device through short range communication, and a received signal strength according to the short range communication satisfies a specific threshold value, the electronic device may determine that the electronic device is in a proximity state to the external device, and exchange data with the external device through short range communication. The electronic device may determine whether the external device supports 60 GHz communication through short range communication with the external device.

According to an embodiment, the electronic device may acquire information for the second communication from the external device or exchange information with the external device. The information for the second communication may include information indicating whether 60 GHz communication is supported. According to an embodiment, when the external device transmits the information for the first communication to the electronic device, the external device may transmit the information for the second communication additionally. For example, when the external device transmits information about wireless charging (e.g., a support voltage or a manufacturer) to the electronic device, the external device may transmit information indicating whether the 60 GHz communication is supported, together.

The information for the second communication may be exchanged between the electronic device and the external device. The information for the second communication may include a HW ID of the external device. The HW ID may be exchanged through VSIE. The electronic device or the external device may specify an electronic device such as a dock, a kiosk, or a mobile device based on the HW ID.

The information for the second communication may include information about an operation mode supportable by the external device. For example, the external device may notify the electronic device that the external device includes a WSB or WSB standard and is capable of wireless USB connection based on USB over IP.

According to an embodiment, even in a case in which the external device does not support USB over IP, the external device may transmit information about USB over IP to the electronic device through VSIE when supporting any one of the STA, P2P, or AP modes in relation to 60 GHz communication. The description for a VSIE format for transmitting information for the second communication will be given with reference to FIG. 10.

(c) Operation 907 of Enabling Second Communication (Operation of 60 GHz Communication)

When the external device supports 60 GHz communication and a 60 GHz communication chip (e.g., the second communication circuit 140 of FIG. 2) of the electronic device is in a disabled state, the electronic device may enable the 60 GHz communication chip. According to one embodiment, when the external device supports 60 GHz communication, but the 60 GHz communication chip (e.g., the second communication circuit 240 of FIG. 2) of the external device is in a disabled state, the electronic device may request the 60 GHz communication chip to be enabled.

(d) Operation of Determining Whether WSB/WSE or USB Over IP is Supported in Operation 909

The electronic device may determine whether wireless USB based on USB over IP including WSB/WSE or the like is supported through the first communication, and determine whether to perform connection according to a general wireless connection method including a STA, Soft AP, or P2P mode or perform a USB connection. For example, when wireless USB is not supported, a general wireless connection method including a STA, Soft AP, or P2P mode may be performed. On the other hand, when supporting wireless USB, a USB connection may be performed using a specific USB over IP technique including WSB/WSE.

(e) Operation of Determining USB Role in Operation 911

When performing a USB connection between two electronic devices, the electronic devices may be classified into the role of a host managing the flow of information and data on the connection and the role of a 'device' operated by the control of the host.

When the external device notifies the electronic device that the external device supports a wireless USB method (or USB over IP), the external device may notify the role of a relevant device together. When the external device notifies its role as "device", the electronic device may set its role to the host, and when the external device notifies its role as the host, the electronic device may set its role to "device".

According to an embodiment, the above-described operation may be performed in an electronic device. For example, when the electronic device notifies the external device that the electronic device supports wireless USB (or USB over IP), the electronic device may notify the role of the electronic device, together. When the electronic device sets its role to "device" and notifies it, the role of the external device may be a host.

(f) Operation of Determining a STA, Soft AP or P2P Mode in Operation 919

When the external device notifies that the external device operates in the STA mode through first communication, the electronic device may operate in the Soft AP mode. When the external device notifies that the external device operates in the AP mode, the electronic device may operate in the STA mode. When the external device notifies that the external device operates in the P2P mode, the electronic device may operate in the P2P mode. In other words, the electronic device may determine the operation mode of the electronic device based on the operation mode of the external device.

According to an embodiment, the external device transmits a HW ID, but may not transmit information on the operation mode related to 60 GHz communication. In this case, the electronic device may select a relative operation mode according to a corresponding HW ID. In this case, it may be assumed that the relative operation mode according to the HW ID is predefined. For example, in a case in which the external device transmits a HW ID for a dock device to the electronic device and it is specified that the electronic device operates in the STA mode when the external device is the dock device, the first electronic device may operate in the STA mode and the external device may operate in the soft AP mode.

(g) Generation of Beam Pattern in Operation 913 or Operation 921

According to an embodiment, the electronic device or the external device may separately manage and use antenna-related parameters in a memory based on information on events and/or second communication. For example, the electronic device or the external device may determine antenna-related parameters based on the HW ID. In other words, the electronic device or the external device may manage and use the antenna-related parameters in the memory according to the HW ID.

For example, in a case in which the electronic device identifies the HW ID, when the 60 GHz communication is triggered by NFC or magnetic induction type wireless charging, a smaller number (e.g., 1 to 4) of antennas may be activated, and when the 60 GHz communication is triggered by magnetic resonance type wireless charging with a relatively long distance, a larger number (e.g., 4 to 8) of antennas than that of the NFC or magnetic induction type wireless charging may be activated, thus using a beam pattern with a narrow beam width and a relatively-long coverage.

According to an embodiment, even when the fixed pattern is used, the electronic device or the external device may support multiple directions. In this case, the electronic device may experimentally determine a phase vector corresponding to each direction, and store and use a plurality of phase vectors in a memory.

According to an embodiment, the fixed beam pattern may be a beam pattern having different phase vectors depending on circumferences, but a characteristic of the beam pattern corresponding to operation 901 may be within a first beam pattern range.

(h) Operation of Performing WSB/WSE or USB-Related Discovery Based on the Fixed Beam Pattern of Operation 913

According to an embodiment, when the electronic device identifies that the external device supports USB over IP-based wireless USB including WSB/WSE or the like through first communication, and identifies the USB role of the external device, the electronic device may perform WSB/WSE or USB-related discovery with a specific USB role based on a fixed beam pattern.

When the electronic device performs the WSB/WSE method, the electronic device may perform P2P-based discovery and connection and establish a WSB/WSE session.

When the electronic device performs a non-standard wireless USB method, the electronic device may operate as a USB role and in a mode promised between devices in advance, and perform discovery and a connection. For example, assuming that the external device acts as a USB device in the AP mode, the electronic device may act as a USB host in the STA mode, discover the external device, and transmit wireless USB-related packets only to a specific TCP port promised in advance.

Operation 917 of Performing a USB Connection

When a WSB/WSE session setup is completed on the external device supporting WSB/WSE, the electronic device may recognize that the wireless USB is connected thereto. When using the non-standard wireless USB method, the electronic device may set up a session through communication using a specific TCP port, process all packets performing communication through a specific port as wireless USB packets, and recognize that the USB connection is established.

(j) Operation 923 of Performing Discovery and Connection Based on the Fixed Beam Pattern When a specific event according to operation 901 occurs (recognition of a proximity state to an external device), a first beam pattern only may be used. In this case, the electronic device may use the fixed beam pattern.

According to an embodiment, the electronic device may use only a limited number of sectors to reduce time required for an SLS operation across a plurality of sectors. The SLS operation may be an operation compliant with the IEEE 802.11ad protocol.

According to an embodiment, the electronic device may store a plurality of antenna-related parameters (or phase vectors) and perform the SLS protocol for several sector directions.

Alternatively, the electronic device may perform the SLS protocol for one sector direction using one antenna-related parameter. For example, when the electronic device uses a first beam pattern and the number of phase vectors is 1, the electronic device may perform SLS using only one sector. For a detailed description, reference may be made to operations related to performance of the SLS protocol of FIG. 11.

When the electronic device discovers the external device through the SLS, a connection between the electronic device and the external device may be performed by an existing method (e.g., a method according to a WLAN system) according to an operation mode determined previously.

Figure 10:
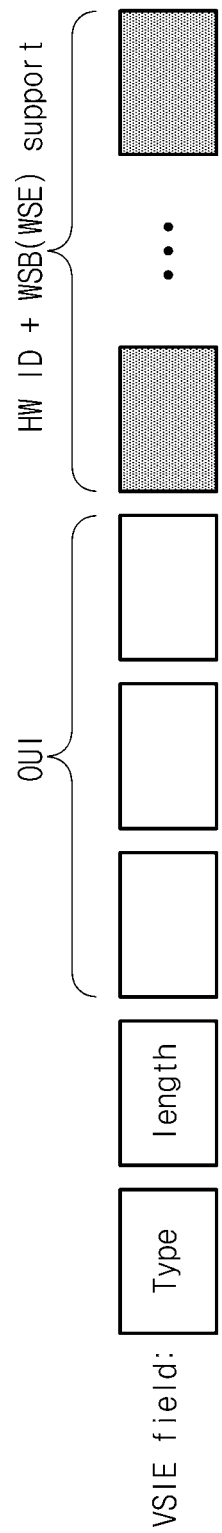
FIG. 10 shows an example of a VSIE format according to an embodiment.

FIG. 10 illustrates an example of a vendor specific identifier element (VSIE) format according to an embodiment.

According to an embodiment, the VSIE may be included in a management frame (e.g., beacon, probe, or action frames). The VSIE may be used to transmit information not defined in the IEEE 802.11 related standards, for example.

According to an embodiment, the VSIE format may include a type field, a length field, and an organization unique identifier (OUI) field.

The type field may be a field indicating an Ethernet type. For example, the type field may indicate that the upper layer protocol is an IP (interne protocol).

The length field may indicate the length of specific information (e.g., a specific identifier). The OUI field may indicate a manufacturer, an operator, or a vendor identity.

According to an embodiment, the VSIE format may carry information about an HW ID, whether WSB/WSE is supported, or the like on data of several bytes. According to an embodiment, the HW ID and whether WSB/WSE is supported may be arranged after the organization unique identifier (OUI) field. Electronic devices may be able to exchange VSIE data at around tens of ms because the first communication supports speeds of several kbps to hundreds of kbps.

Figure 11A:
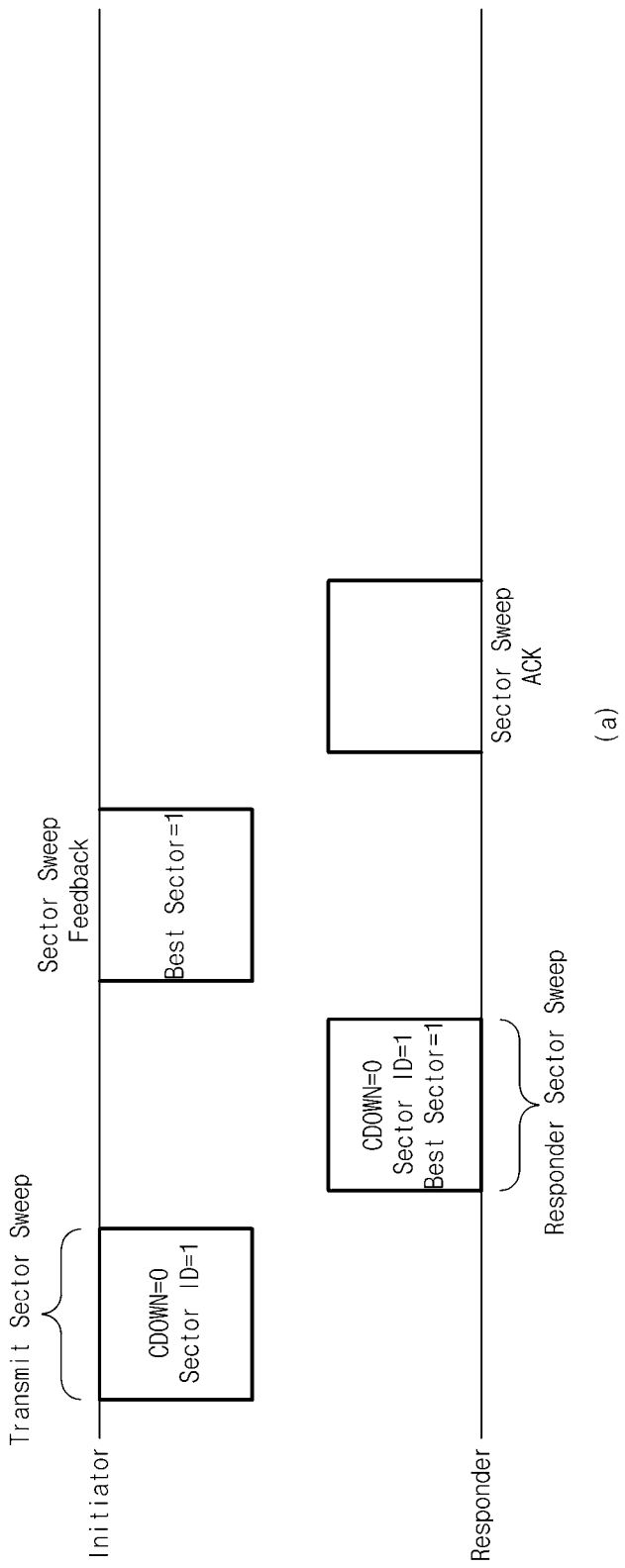
FIGS. 11A and 11B show an example of an SLS operation according to an embodiment.
Figure 11B:
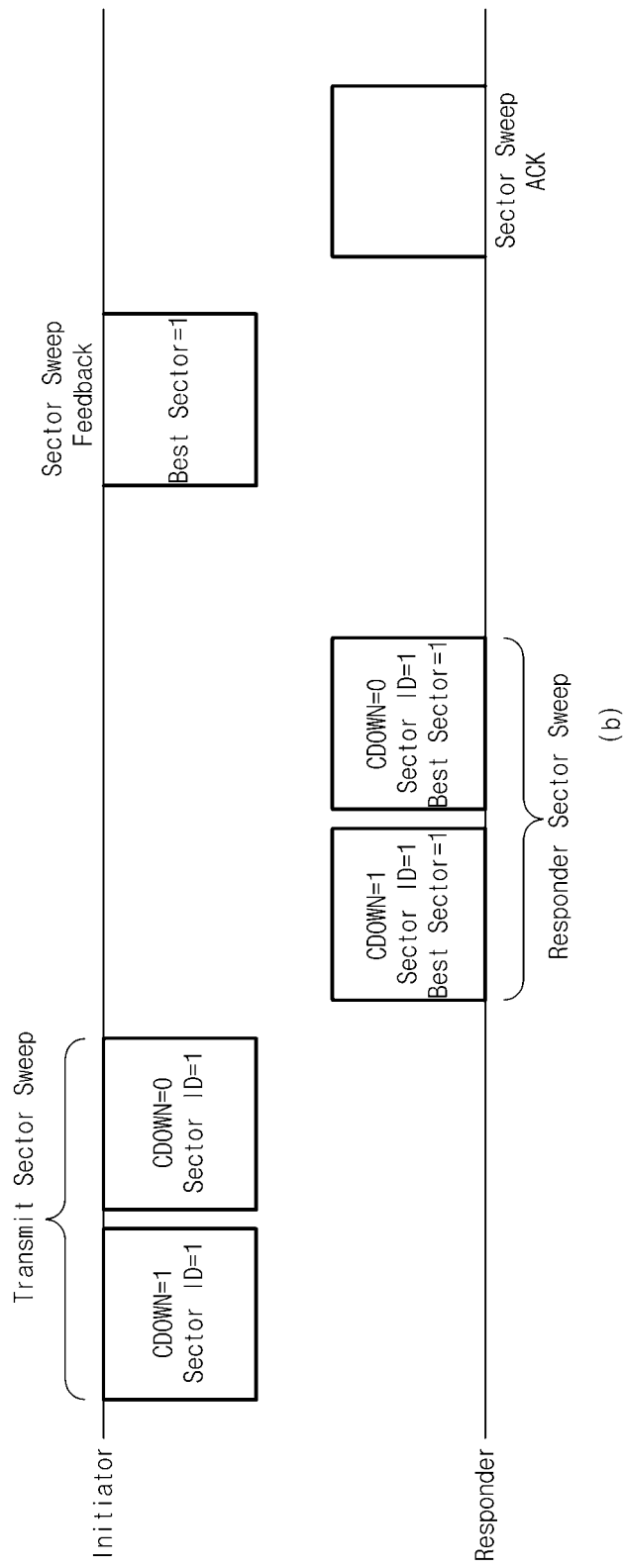

FIGS. 11A and 11B illustrate an example of an SLS operation capable of being applied to various embodiments disclosed in the disclosure.

The electronic device may reduce the number of sectors used when performing SLS. FIG. 11A illustrates a case where the number of sectors to be used is one. In this case, the electronic device may set a CDOWN value to 0 in a first series of sector sweep (SSW) packet during transmit sector sweep and/or responder sector sweep, and transmit a packet. Accordingly, the electronic device does not perform link detection for other sectors, thus reducing a time for the SLS operation.

FIG. 11B illustrates a case in which a plurality of SSW packets are transmitted for one sector used by the electronic device.

The electronic device may use one sector and transmit a plurality of SSW packets for the same sector. For example, when the electronic device transmits and receives two duplicate SSW packets with the same sector ID, the first SSW packet may be set to CDOWN=1, and consecutively transmit packets carrying two same sector ID information may be continuously transmitted.

When the SSW packet is not received by an external device that is a peer device of the electronic device, link detection may be performed again by waiting for the next BTI time.

When the same SSW packet is repeatedly transmitted/received as shown in FIG. 11B, the probability of link detection may be increased, so that a time for the link detection may be reduced compared to performing SLS again in the next BTI time.

In the case of an 802.11ad system, when the same SSW packet is repeatedly transmitted for one sector because the number of sectors is large, the time required to perform the SLS protocol may be increased. However, when the fixed beam pattern is used as described above, SLS may be performed only on a limited number of sectors or one sector, and therefore, the SLS time may be shorter than in the prior art even through the same SSW packet is repeatedly transmitted. Also, it is possible to efficiently connect devices even without using all beam patterns because events with other electronic devices are considered.

As described above, when a scenario of a proximity mode is set and a relatively small number of antennas are used, the number of active antennas may be reduced from 8 to 4, for example, compared to the case of the connection operation of a conventional electronic device. When approximately one active antenna is turned off, power consumption of about 40 mW may be reduced. Therefore, when the number of active antennas is reduced, power consumption may be relatively reduced.

When the number of sectors is reduced when operating in the proximity mode, a time for detection between electronic devices may be reduced by the inverse number of the number of sectors. For example, in the case of docking, the time for displaying the screen of the electronic device on a display connected to the external device may be reduced during the first connection due to a decrease in the time for detection between devices.

In addition, as a power level increases, an error vector magnitude (EVM) performance may deteriorate during transmission, and when the power level is reduced at a short distance, the EVM performance may be improved.

Figure 12:
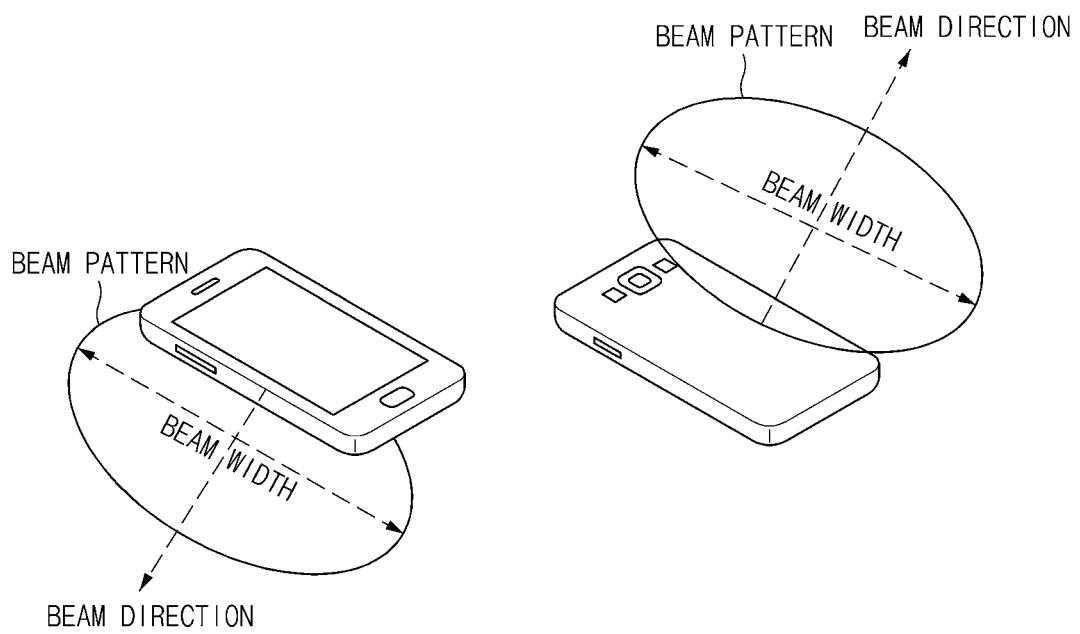
FIG. 12 shows an example of a first beam pattern according to an embodiment.

FIG. 12 shows an example of a first beam pattern according to an embodiment.

The electronic device may fix the first beam pattern in a reference direction (e.g., a rear cover direction in FIG. 12) and reduce and use the number of active antennas. The electronic device may also reduce transmit power for each antenna. Referring to FIG. 12, when the number of active antennas is reduced, the first beam pattern may have a relatively wide beam width compared to a case where the number of active antennas is large in the reference direction, and a coverage corresponding to the first beam pattern may support a relatively-limited coverage within several centimeters to several meters, compared to a case in which a large number of active antennas are provided or transmit power is high.

According to an embodiment, when the electronic devices move away after being connected to the external device with a fixed beam pattern according to an event of proximity between the electronic devices as shown in FIG. 9, the electronic device and/or the external device may change antenna-related parameters. For example, the electronic device may adaptively change the beam pattern according to a state between the electronic device and the external device.

To this end, the electronic devices may change antenna-related parameters based on a distance and/or radio conditions, and the electronic devices may define a mode according to the antenna-related parameters.

In the following embodiment, for convenience of description, a proximity mode, a short range mode, and a default mode may be defined according to attributes of the parameters, such as the number of active antennas, the number of SLS sectors, and a power level for each antenna. In the following description, the modes may be referred to as a proximity beam mode.

The proximity mode may mean a mode in which the number of active antennas and/or the number of SLS sectors is the lowest and the power level for each antenna is the lowest.

The short range mode may be a mode for supporting 60 GHz communication within several meters. In the short range mode, the number of active antennas and/or the number of SLS sectors may be set to be greater than or equal to those in the proximity mode, and the power level for each antenna may be set to be greater than or equal to the power in the proximity mode.

The default mode may be a mode using the number of active antennas, the number of SLS sectors, and the power level set by default for general 60 GHz communication.

The number of active antennas may be set to 2 in the proximity mode, 4 in the short range mode, 8 in the default mode, and the like.

The number of SLS sectors may be set to, for example, one in the proximity mode and the number of sectors capable of covering all three-dimensional spaces in the short range mode and the default mode.

The power level may be set to, for example, a value capable of covering a distance within 50 cm in the proximity mode, a value capable of covering a distance within 1 meters to 3 meters in the short range mode, and a power level value above the power level which is used in a short range mode set by default in the default mode.

Figure 13:
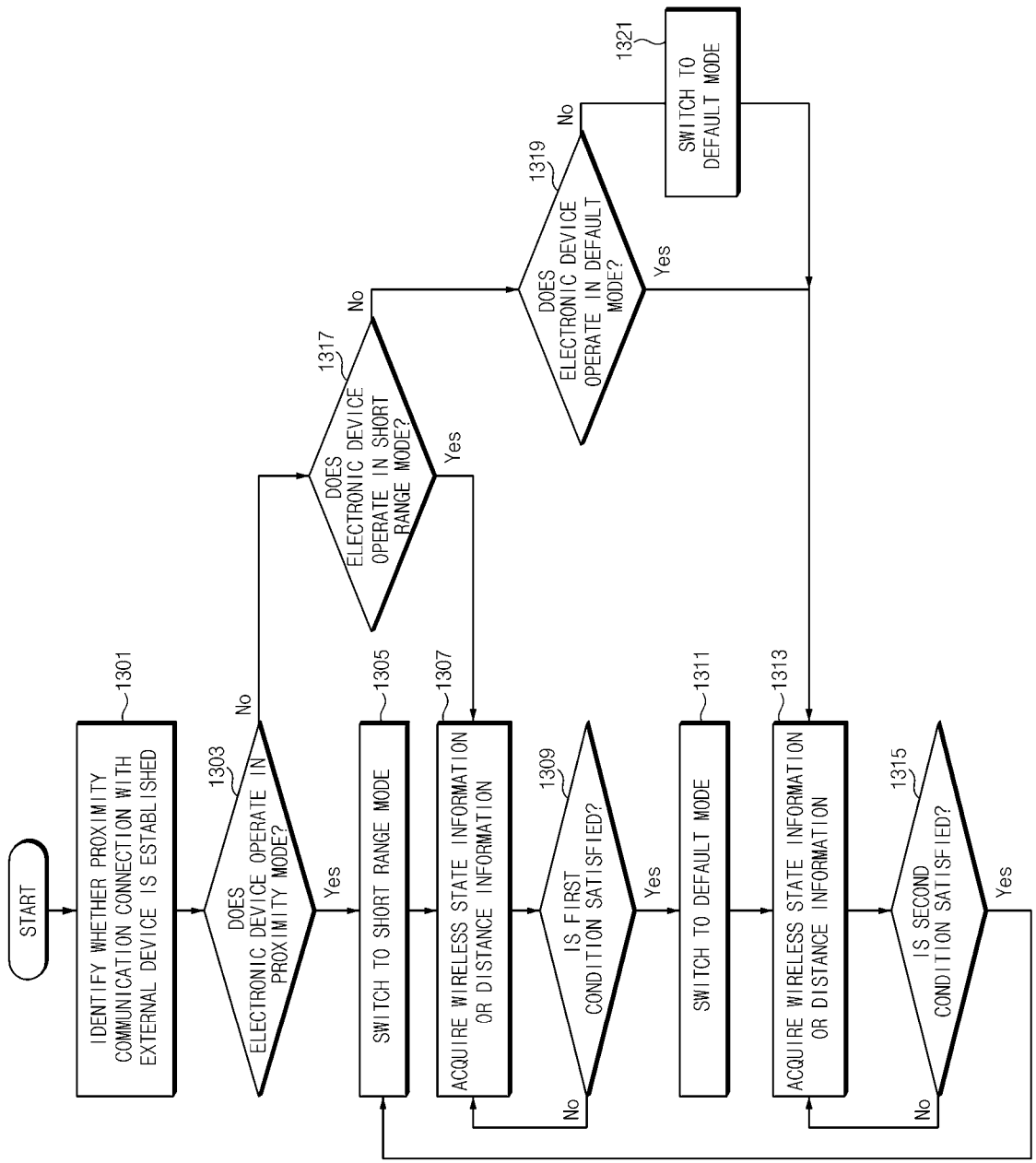
FIG. 13 is a flowchart of a beamforming operation after proximity connection of an electronic device according to an embodiment.

FIG. 13 is a flowchart of a beamforming operation after proximity connection of an electronic device according to an embodiment.

According to an embodiment, after the proximity connection according to FIG. 9, the use of the fixed pattern determined in FIG. 9 as it is even in a situation in which proximity communication is disconnected may be inefficient in 60 GHz communication or have problems in data transmission and reception. Accordingly, the electronic device may set a beam operation mode suitable for 60 GHz communication in consideration of a connection situation with an external device even after proximity communication connection. Here, to set the beam operation mode for 60 GHz communication, the electronic device may use wireless communication state and/or distance information.

Operations illustrated in FIG. 13 may be performed by the electronic device 100 or the external device 200 illustrated in FIG. 2. The operations may be implemented with instructions that may be performed (or executed) by the processor 110 of the electronic device 100, for example. The instructions may be stored in, for example, a computer recording medium or the electronic device 100 or the external device 200 shown in FIG. 2. Hereinafter, in the description of FIG. 13, an embodiment will be described collectively as an operation of the electronic device. Here, the electronic device may be an electronic device as a subject of the following operations. The electronic device may be the electronic device 100 or the external device 200 of FIG. 2. Furthermore, the external device may be a peer device or an external electronic device of the electronic device, and may be either the electronic device 100 or the external device 200 of FIG. 2.

In operation 1301, the electronic device may identify whether a proximity communication connection is established while operating in the proximity mode. According to an embodiment, the electronic device may recognize that the NFC or wireless charging state is stopped. For example, the electronic device may detect that the electronic device is located adjacent to an external electronic device and is far away from the external device.

In operation 1303, in response to the identification, the electronic device may identify a currently-set mode. For example, the electronic device may identify whether the electronic device is operating in the proximity mode.

When the electronic device is operating in the proximity mode, the electronic device may switch to the short range mode in operation 1305 because it is recognized that the electronic device is out of a distance capable of the NFC or wireless charging as in operation 1301. For example, as described above, the electronic device may apply antenna-related parameters set for the short range mode and perform 60 GHz communication.

The electronic device may identify whether the current beam operation mode is suitable based on radio state information and/or distance information, and change the beam operation mode if necessary.

In operation 1307, the electronic device may acquire radio state information and/or distance information. According to an embodiment, the electronic device may acquire the radio state information or distance information periodically or aperiodically as necessary. The radio state information may include, for example, a signal to noise ratio (SNR).

In operation 1309, the electronic device may identify whether the acquired information satisfies a condition (first condition) for switching to a default mode. For example, the electronic device may identify whether a specific threshold value is satisfied. The electronic device may identify whether the SNR is less than (or less than or equal to) a first threshold value, and/or identify whether the distance is greater than (or greater than or equal to) a second threshold value.

When the acquired information does not satisfy the threshold value, the electronic device may still perform operation 1307 in the short range mode.

When the acquired information satisfies the threshold value, in operation 1311, the electronic device may switch to the default mode. The electronic device may set antenna-related parameters according to the default mode and perform 60 GHz communication with the external device.

In operation 1313, the electronic device may acquire radio state information and/or distance information. According to an embodiment, the electronic device may acquire the radio state information or distance information periodically or aperiodically as necessary. The radio state information may include, for example, a signal to noise ratio (SNR).

In operation 1315, the electronic device may determine whether the obtained information satisfies a condition (second condition) for switching to the proximity distance mode. The electronic device may perform determination based on a specific threshold value. For example, the electronic device may determine whether the SNR is greater than or equal to (or greater than) a third threshold value. Here, the third threshold value may be a value greater than the first threshold value (e.g., first threshold value+a). Alternatively, the electronic device may determine whether the distance information is less than or equal to (or less than) the second threshold value.

When the above condition is satisfied, in operation 1305, the electronic device may switch to the short range mode.

When the above conditions are not satisfied, the electronic device may operate in the default mode and perform operation 1315 periodically or aperiodically.

When it is determined in operation 1303 that the electronic device does not operate in the proximity mode, in operation 1317, the electronic device may determine whether the electronic device operates in the short range mode. When operating in the short range mode, the electronic device may perform operation 1307 and, when not operating in the short range mode, determine whether the electronic device operates in the default mode in operation 1319. When the electronic device already operates in the default mode, the electronic device may perform operation 1313.

When the electronic device does not operate in the default mode, in operation 1321, the electronic device may switch the operation mode to the default mode and perform operation 1313.

As described above, the electronic device may appropriately use the proximity mode, the short range mode, and the default mode according to the SNR or distance, and reduce power consumption.

According to an embodiment, the event may include various cases capable of simplifying and using a beam pattern in addition to a case in which a proximity connection capable of using proximity communication between devices occurs as illustrated in FIG. 9. For example, the electronic device may define a specific direction beam mode and perform a second communication connection with a peer device (e.g., the external device 200) using a fixed beam pattern in the specific direction beam mode.

According to an embodiment, the specific direction beam mode may be a mode using a second beam pattern different from the first beam pattern.

Figure 14:
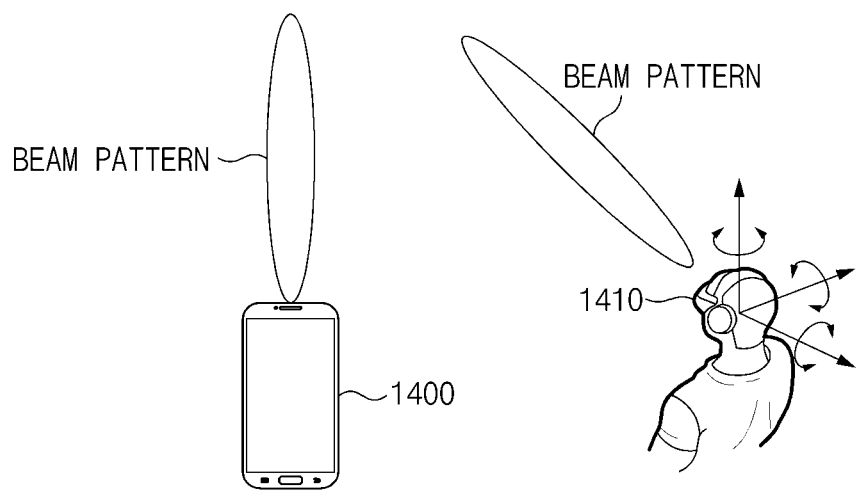
FIG. 14 is an example of a second beam pattern according to an embodiment.

FIG. 14 is an example of a second beam pattern according to an embodiment.

The second beam pattern may be a beam pattern that is different from the first beam pattern of FIG. 12 and is fixed in a specific direction, and has a narrow beam width but a long coverage.

Referring to FIG. 14, the specific beam direction is illustrated as being set to an upper portion of an electronic device 1400 or a front portion of a head mount display (HMD) electronic device 1410. In addition, the specific beam direction may be set in various directions according to application characteristics.

According to an embodiment, the electronic device 1400 may specify and use at least one second beam pattern having a specific beam, beam direction, and/or beam coverage to provide a specific direction beam mode. For example, an antenna-related parameter having the second beam pattern may be stored in advance and used. The electronic device 1400 may include one phase vector or a plurality of phase vectors capable of forming the second beam pattern.

According to an embodiment, the electronic device 1400 may allow a user to select a beam in a specific direction. In this case, the electronic device 1400 may provide a UI through which the beam is set such that the beam is associated with a specific scenario or a specific application (or service).

According to an embodiment, the specific direction beam mode may be associated with a specific application. When a user executes the specific application, the electronic device 1400 may operate in the specific direction beam mode. The electronic device 1400 may generate the second beam pattern in response to, for example, execution of the specific application, and search for a peer device with the second beam pattern.

According to an embodiment, the electronic device 1400 may automatically connect to the external device according to a predetermined condition when operating in the specific direction beam mode. The electronic device 1400 may store automatic connection conditions for the second beam pattern. The electronic device 1400 may determine an automatic connection condition for the second beam pattern, display the peer device on the UI of the electronic device 1400 based on a result of the determination of the automatic connection condition, or automatically perform connection. The electronic device 1400 may provide a list of services acquired through a service discovery process with the peer device. In this case, the electronic device 1400 may perform the service based on a user input.

According to an embodiment, the communication connection may be a communication connection using the second communication circuit 140 of FIG. 2. For example, the communication connection may be a 60 GHz communication connection.

Figure 15:
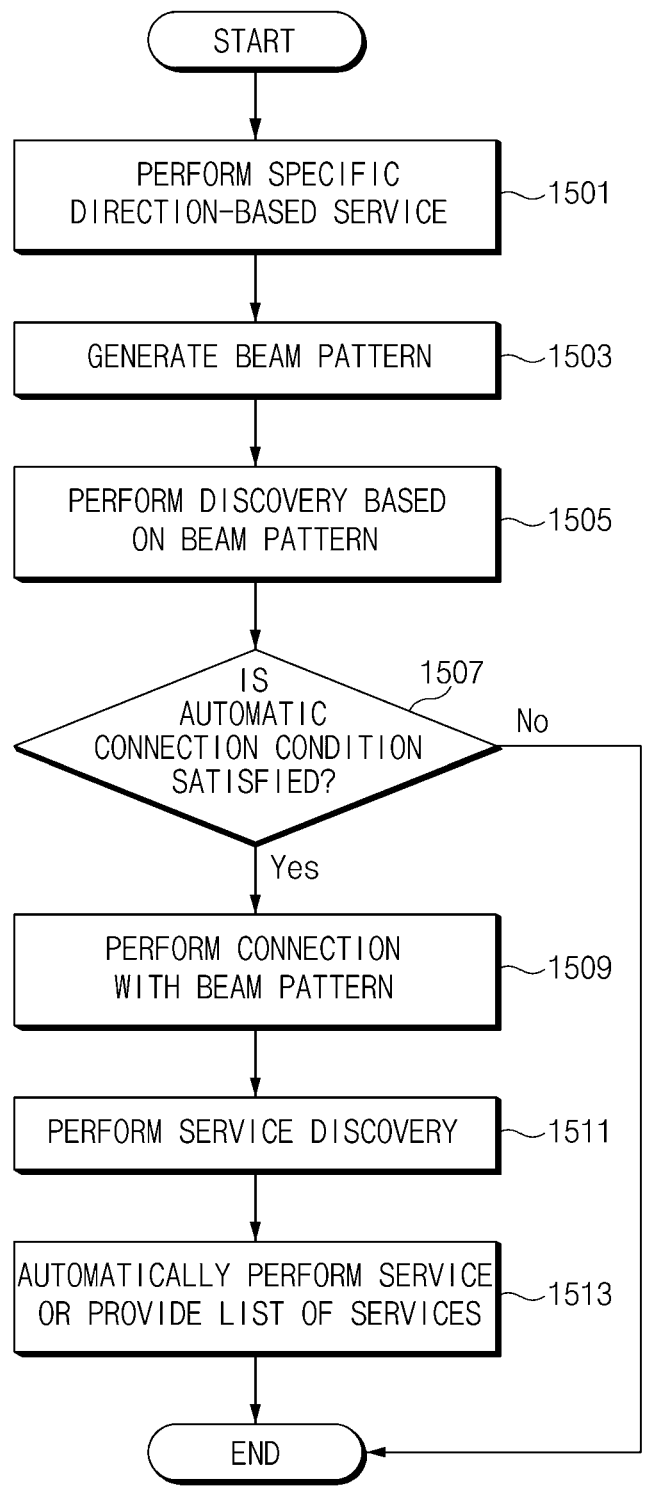
FIG. 15 is a flowchart of an operation of performing a communication connection in a specific direction beam mode in an electronic device according to an embodiment.

FIG. 15 is a flowchart of an operation of performing a communication connection in a specific direction beam mode in an electronic device according to an embodiment.

Operations illustrated in FIG. 15 may be performed by the electronic device 100 or the external device 200 illustrated in FIG. 2. The operations may be implemented with instructions that may be performed (or executed) by the processor 110 of the electronic device 100 or the processor 210 of the external device 200, for example. The instructions may be stored in, for example, a computer recording medium or the electronic device 100 or the external device 200 shown in FIG. 2. Hereinafter, in the description of FIG. 15, an embodiment will be described collectively as an operation of the electronic device.

In operation 1501, the electronic device may perform a specific direction-based 60 GHz service. For example, the specific direction-based 60 GHz service may be an application associated with the specific direction beam mode or a service associated with the specific direction beam mode. According to an embodiment, when a 60 GHz connection is assumed in the specific direction beam mode, and a connection of 60 GHz communication may be required when providing the application or service.

In operation 1503, the electronic device may generate a second beam pattern (e.g., the second beam pattern of FIG. 14) in response to the performance of the service. For example, the electronic device may determine an antenna-related parameter to generate the second beam pattern.

In operation 1505, the electronic device may perform a discovery operation based on the second beam pattern. The electronic device may use the second beam pattern fixedly during the discovery operation. The electronic device may find a peer device (e.g., an external device) through the discovery operation.

In operation 1507, the electronic device may determine whether the automatic connection condition is satisfied, and when the condition is satisfied, in operation 1509, perform connection with the peer device based on the second beam pattern.

In operation 1511, the electronic device may perform service discovery, and in operation 1513, automatically perform a service or provide a list of services.

When the automatic connection condition is not satisfied, the electronic device may not perform an automatic connection.

Hereinafter, operations in FIG. 15 will be described in detail.

Operation of Setting a Beam Pattern Before Operation 1501

Although not illustrated in FIG. 15, before operation 1501 is performed, the electronic device may provide a UI for selecting a second beam pattern and a UI linking the second beam pattern with a specific application. For example, the electronic device may provide a UI for allowing a user to select a direction at a specific angle as the second beam pattern with respect to the electronic device, and perform linking to use the second beam pattern when using a specific application capable of performing a 60 GHz connection.

Operation 1501 of Performing a Service Based on a Specific Direction

When a specific application is executed, the electronic device may perform an operation of generating a second beam pattern associated with the specific application. Here, the second beam pattern may be a beam pattern associated with the specific application in the operation of setting the beam pattern. The electronic device may store parameters capable of generating the beam pattern, and apply the parameters when the specific application is executed.

When the application is executed, the electronic device may generate the second beam pattern and perform communication connection according to the flowchart of FIG. 15. When the application includes a specific service, connection to the specific service may be performed after the connection is performed. For example, when the application is able to perform playback of media, it is possible to perform the communication connection and play back the media (c) Operation 1503 of Generating a Second Beam Pattern The electronic device may determine antenna-related parameters and generate the second beam pattern which has a specific beam width and is directed in a specific direction using the antenna-related parameters. The antenna-related parameters may include one of the number of active antennas, a phase shift value, or an active antenna. The electronic device may store antenna-related parameters for generating the second beam pattern in a memory in advance.

The second beam pattern may be a beam pattern having a specific direction and a specific width as shown in FIG. 14.

(d) Operation 1505 of Performing Discovery with the Second Beam Pattern

The electronic device may perform 60 GHz communication and an SLS operation, and may find a peer device based on the second beam pattern. In this case, the SLS operation may be the same as or similar to the discovery operation described with reference to FIG. 9. For example, the electronic device may set a CDOWN value for a limited sector and exchange SSW packets. The electronic device may repeatedly exchange SSW packets for the same sector.

When a beam pattern direction of the electronic device is set to the second beam pattern direction with respect to a peer device, the electronic device may perform a quick search and may not search for electronic devices existing in other sectors. For example, as illustrated in FIG. 14, when setting the second beam pattern, the electronic device may search for only peer devices positioned in a direction which an upper portion of the electronic device points or in a direction which the user looks through the HMD device.

(e) Operation 1507 of Determining an Automatic Connection Condition

When the electronic device succeeds in searching for the peer device using the second beam pattern, the electronic device may determine an automatic connection condition. The electronic device may determine the automatic connection condition using at least one of a value capable of being estimated using a wireless communication signal such as a received signal strength indicator (RSSI) of the electronic device, a signal to interference plus noise ratio (SINR), a value capable of being estimated using a wireless communication signal, such as an angle or distance of a peer device, or sensor information through a Gyroscope sensor and/or an acceleration sensor. For example, when the RSSI or SINR is greater than a specific condition, and the estimated angle is within a specific angle with the direction of the selected transmit/receive beam, or a distance estimated by, for example, 802.11ac fine timing measurement (FTM) technique is within a specific distance with respect to the discovered peer device, the peer device may be displayed on the UI of the electronic device.

(f) Operation 1509 of Performing a Connection Based on the Second Beam Pattern

When the automatic connection condition is satisfied, the electronic device may perform communication connection with a peer device that satisfies the condition. When there is a history indicating that electronic devices have been already connected or the electronic devices exchange passphrase through VSIE, the connection between the electronic devices may be performed using a previously-acquired passphrase.

When there is no previously-obtained passphrase, the connection may be performed using a Wi-Fi protected setup (WPS) method. For example, the electronic device may perform a connection between the electronic devices through steps such as scan, search, discovery, group formation, provision, or (P) BSS setup.

(g) Operation 511 of Automatically Operating a Service or Providing a List of Services When the electronic device finishes the connection with the peer device based on the second beam pattern, the electronic device may provide a list of services associated with the application that has triggered the connection or perform a specific service. For example, when the application is linked to a media playback service, the content of the electronic device can be mirrored to a peer device or vice versa. For example, when the corresponding application is associated with a USB storage-related service, the electronic device may provide a list of services related to storage or file transfer of the peer device.

When setting and using a beam pattern in a specific direction in advance as described above, the electronic device may automatically perform a service desired by the user in cooperation with a specific app with a pointing operation by the user, thereby enabling intuitive use.

Figure 16:
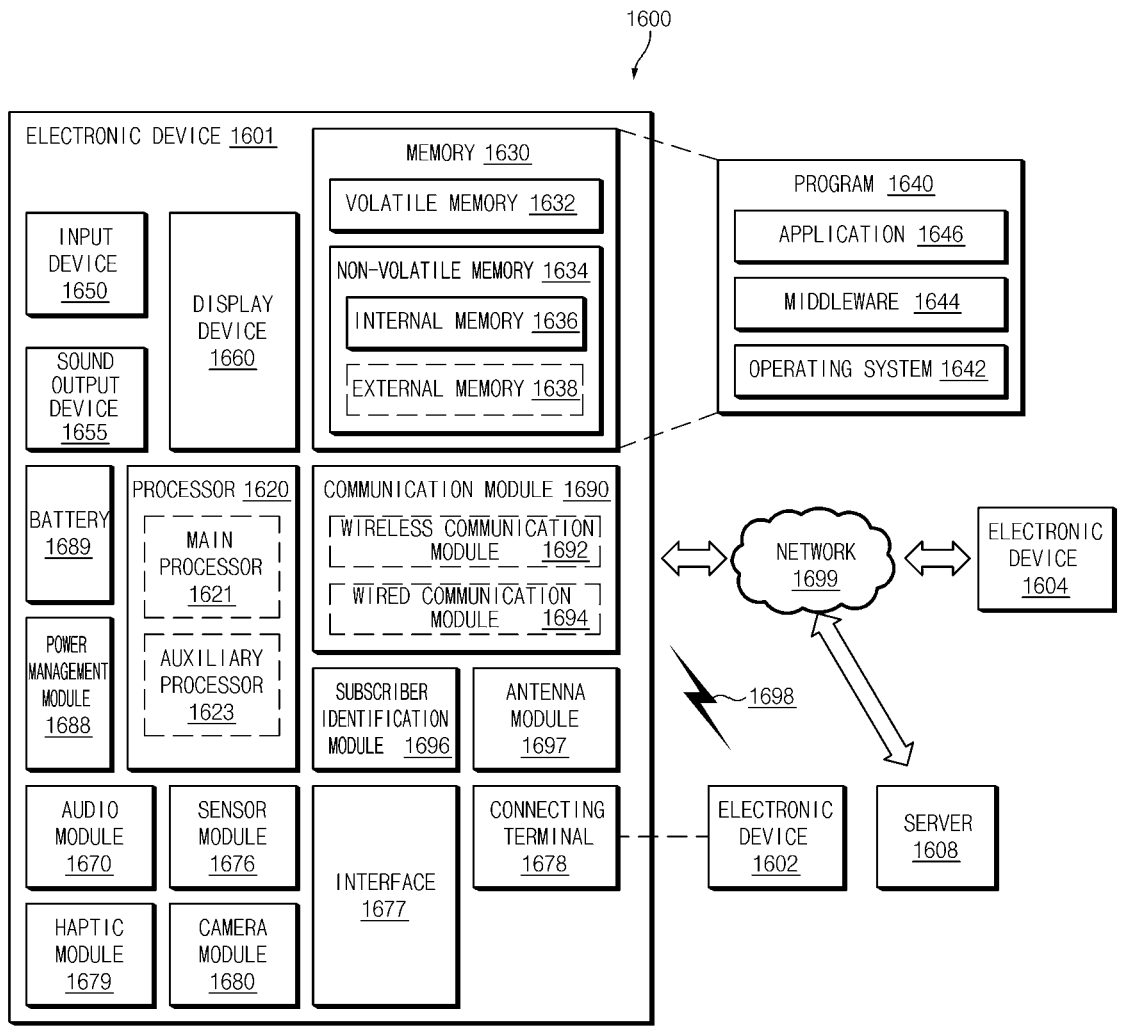
FIG. 16 is a block diagram of an electronic device in a network environment, according to various embodiments.

FIG. 16 is a block diagram of an electronic device in a network environment according to various embodiments.

Referring to FIG. 16, an electronic device 1601 may communicate with an electronic device 1602 through a first network 1698 (e.g., a short range wireless communication) or may communicate with an electronic device 1604 or a server 1608 through a second network 1699 (e.g., a long-distance wireless communication) in a network environment 1600. According to an embodiment, the electronic device 1601 may communicate with the electronic device 1604 through the server 1608. According to an embodiment, the electronic device 1601 may include a processor 1620, a memory 1630, an input device 1650, a sound output device 1655, a display device 1660, an audio module 1670, a sensor module 1676, an interface 1677, a haptic module 1679, a camera module 1680, a power management module 1688, a battery 1689, a communication module 1690, a subscriber identification module 1696, and an antenna module 1697. According to some embodiments, at least one (e.g., the display device 1660 or the camera module 1680) among components of the electronic device 1601 may be omitted or other components may be added to the electronic device 1601. According to some embodiments, some components may be integrated and implemented as in the case of the sensor module 1676 (e.g., a fingerprint sensor, an iris sensor, or an illuminance sensor) embedded in the display device 1660 (e.g., a display).

The processor 1620 may operate, for example, software (e.g., a program 1640) to control at least one of other components (e.g., a hardware or software component) of the electronic device 1601 connected to the processor 1620 and may process and compute a variety of data. The processor 1620 may load a command set or data, which is received from other components (e.g., the sensor module 1676 or the communication module 1690), into a volatile memory 1632, may process the loaded command or data, and may store result data into a nonvolatile memory 1634. According to an embodiment, the processor 1620 may include a main processor 1621 (e.g., a central processing unit or an application processor) and an auxiliary processor 1623 (e.g., a graphic processing device, an image signal processor, a sensor hub processor, or a communication processor), which operates independently from the main processor 1621, additionally or alternatively uses less power than the main processor 1621, or is specified to a designated function. In this case, the auxiliary processor 1623 may operate separately from the main processor 1621 or embedded.

In this case, the auxiliary processor 1623 may control, for example, at least some of functions or states associated with at least one component (e.g., the display device 1660, the sensor module 1676, or the communication module 1690) among the components of the electronic device 1601 instead of the main processor 1621 while the main processor 1621 is in an inactive (e.g., sleep) state or together with the main processor 1621 while the main processor 1621 is in an active (e.g., an application execution) state. According to an embodiment, the auxiliary processor 1623 (e.g., the image signal processor or the communication processor) may be implemented as a part of another component (e.g., the camera module 1680 or the communication module 1690) that is functionally related to the auxiliary processor 1623. The memory 1630 may store a variety of data used by at least one component (e.g., the processor 1620 or the sensor module 1676) of the electronic device 1601, for example, software (e.g., the program 1640) and input data or output data with respect to commands associated with the software. The memory 1630 may include the volatile memory 1632 or the nonvolatile memory 1634.

The program 1640 may be stored in the memory 1630 as software and may include, for example, an operating system 1642, a middleware 1644, or an application 1646.

The input device 1650 may be a device for receiving a command or data, which is used for a component (e.g., the processor 1620) of the electronic device 1601, from an outside (e.g., a user) of the electronic device 1601 and may include, for example, a microphone, a mouse, or a keyboard.

The sound output device 1655 may be a device for outputting a sound signal to the outside of the electronic device 1601 and may include, for example, a speaker used for general purposes, such as multimedia play or recordings play, and a receiver used only for receiving calls. According to an embodiment, the receiver and the speaker may be either integrally or separately implemented.

The display device 1660 may be a device for visually presenting information to the user of the electronic device 1601 and may include, for example, a display, a hologram device, or a projector and a control circuit for controlling a corresponding device. According to an embodiment, the display device 1660 may include a touch circuitry or a pressure sensor for measuring an intensity of pressure on the touch.

The audio module 1670 may convert a sound and an electrical signal in dual directions. According to an embodiment, the audio module 1670 may obtain the sound through the input device 1650 or may output the sound through an external electronic device (e.g., the electronic device 1602 (e.g., a speaker or a headphone)) wired or wirelessly connected to the sound output device 1655 or the electronic device 1601.

The sensor module 1676 may generate an electrical signal or a data value corresponding to an operating state (e.g., power or temperature) inside or an environmental state outside the electronic device 1601. The sensor module 1676 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 1677 may support a designated protocol wired or wirelessly connected to the external electronic device (e.g., the electronic device 1602). According to an embodiment, the interface 1677 may include, for example, an HDMI (high-definition multimedia interface), a USB (universal serial bus) interface, an SD card interface, or an audio interface.

A connecting terminal 1678 may include a connector that physically connects the electronic device 1601 to the external electronic device (e.g., the electronic device 1602), for example, an HDMI connector, a USB connector, an SD card connector, or an audio connector (e.g., a headphone connector).

The haptic module 1679 may convert an electrical signal to a mechanical stimulation (e.g., vibration or movement) or an electrical stimulation perceived by the user through tactile or kinesthetic sensations. The haptic module 1679 may include, for example, a motor, a piezoelectric element, or an electric stimulator.

The camera module 1680 may shoot a still image or a video image. According to an embodiment, the camera module 1680 may include, for example, at least one lens, an image sensor, an image signal processor, or a flash.

The power management module 1688 may be a module for managing power supplied to the electronic device 1601 and may serve as at least a part of a power management integrated circuit (PMIC).

The battery 1689 may be a device for supplying power to at least one component of the electronic device 1601 and may include, for example, a non-rechargeable (primary) battery, a rechargeable (secondary) battery, or a fuel cell.

The communication module 1690 may establish a wired or wireless communication channel between the electronic device 1601 and the external electronic device (e.g., the electronic device 1602, the electronic device 1604, or the server 1608) and support communication execution through the established communication channel. The communication module 1690 may include at least one communication processor operating independently from the processor 1620 (e.g., the application processor) and supporting the wired communication or the wireless communication. According to an embodiment, the communication module 1690 may include a wireless communication module 1692 (e.g., a cellular communication module, a short range wireless communication module, or a GNSS (global navigation satellite system) communication module) or a wired communication module 1694 (e.g., an LAN (local area network) communication module or a power line communication module) and may communicate with the external electronic device using a corresponding communication module among them through the first network 1698 (e.g., the short range communication network such as a Bluetooth, a WiFi direct, or an IrDA (infrared data association)) or the second network 1699 (e.g., the long-distance wireless communication network such as a cellular network, an internet, or a computer network (e.g., LAN or WAN)). The above-mentioned various communication modules 1690 may be implemented into one chip or into separate chips, respectively.

According to an embodiment, the wireless communication module 1692 may identify and authenticate the electronic device 1601 using user information stored in the subscriber identification module 1696 in the communication network.

The antenna module 1697 may include one or more antennas to transmit or receive the signal or power to or from an external source. According to an embodiment, the communication module 1690 (e.g., the wireless communication module 1692) may transmit or receive the signal to or from the external electronic device through the antenna suitable for the communication method.

Some components among the components may be connected to each other through a communication method (e.g., a bus, a GPIO (general purpose input/output), an SPI (serial peripheral interface), or an MIPI (mobile industry processor interface)) used between peripheral devices to exchange signals (e.g., a command or data) with each other.

According to an embodiment, the command or data may be transmitted or received between the electronic device 1601 and the external electronic device 1604 through the server 1608 connected to the second network 1699. Each of the electronic devices 1602 and 1604 may be the same or different types as or from the electronic device 1601. According to an embodiment, all or some of the operations performed by the electronic device 1601 may be performed by another electronic device or a plurality of external electronic devices. When the electronic device 1601 performs some functions or services automatically or by request, the electronic device 1601 may request the external electronic device to perform at least some of the functions related to the functions or services, in addition to or instead of performing the functions or services by itself. The external electronic device receiving the request may carry out the requested function or the additional function and transmit the result to the electronic device 1601. The electronic device 1601 may provide the requested functions or services based on the received result as is or after additionally processing the received result. To this end, for example, a cloud computing, distributed computing, or client-server computing technology may be used.

The electronic device according to various embodiments disclosed in the present disclosure may be various types of devices. The electronic device may include, for example, at least one of a portable communication device (e.g., a smartphone), a computer device, a portable multimedia device, a mobile medical appliance, a camera, a wearable device, or a home appliance. The electronic device according to an embodiment of the present disclosure should not be limited to the above-mentioned devices.

It should be understood that various embodiments of the present disclosure and terms used in the embodiments do not intend to limit technologies disclosed in the present disclosure to the particular forms disclosed herein; rather, the present disclosure should be construed to cover various modifications, equivalents, and/or alternatives of embodiments of the present disclosure. With regard to description of drawings, similar components may be assigned with similar reference numerals. As used herein, singular forms may include plural forms as well unless the context clearly indicates otherwise. In the present disclosure disclosed herein, the expressions "A or B", "at least one of A or/and B", "A, B, or C" or "one or more of A, B, or/and C", and the like used herein may include any and all combinations of one or more of the associated listed items. The expressions "a first", "a second", "the first", or "the second", used in herein, may refer to various components regardless of the order and/or the importance, but do not limit the corresponding components. The above expressions are used merely for the purpose of distinguishing a component from the other components. It should be understood that when a component (e.g., a first component) is referred to as being (operatively or communicatively) "connected," or "coupled," to another component (e.g., a second component), it may be directly connected or coupled directly to the other component or any other component (e.g., a third component) may be interposed between them.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an application-specific integrated circuit (ASIC).

Various embodiments of the present disclosure may be implemented by software (e.g., the program 1640) including an instruction stored in a machine-readable storage media (e.g., an internal memory 1636 or an external memory 1638) readable by a machine (e.g., a computer). The machine may be a device that calls the instruction from the machine-readable storage media and operates depending on the called instruction and may include the electronic device (e.g., the electronic device 1601). When the instruction is executed by the processor (e.g., the processor 1620), the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, the method according to various embodiments disclosed in the present disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components (e.g., the module or the program) may be integrated in one component and may perform the same or similar functions performed by each corresponding components prior to the integration. Operations performed by a module, a programming, or other components according to various embodiments of the present disclosure may be executed sequentially, in parallel, repeatedly, or in a heuristic method. Also, at least some operations may be executed in different sequences, omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. An electronic device comprising:
a housing;
a wireless communication circuit including a non-directional first wireless communication circuit having a first frequency and a first coverage and a directional second wireless communication circuit having a second frequency higher than the first frequency and a second coverage larger than the first coverage, the wireless communication circuit being at least one wireless communication circuit located inside the housing or connected to the housing;
at least one processor operatively connected to the wireless communication circuit; and
a memory operatively connected to the processor,
wherein the memory stores instructions that, when executed, cause the processor to:
acquire an event associated with the first wireless communication circuit,
set a beam pattern based on the event, and
perform a second wireless communication connection with an external device through the second wireless communication circuit and fixedly use the set beam pattern in the second wireless communication connection.

2. The electronic device of claim 1, further comprising:
at least one antenna associated with the second wireless communication circuit,
wherein, when executed, the instructions cause the processor to determine parameters related to the at least one antenna based on the event.

3. The electronic device of claim 2, wherein the parameters related to the antenna includes at least one of: a number of active antennas of the at least one antenna, an active antenna, a sector identifier or antenna transmit power.

4. The electronic device of claim 3, wherein the instructions, when executed, cause the processor to:
perform a first wireless communication connection through the external device and the first wireless communication circuit, and
acquire information on the external device through the first wireless communication circuit.

5. The electronic device of claim 4, wherein the instructions, when executed, cause the processor to determine parameters related to the antenna based on the information on the external device.

6. The electronic device of claim 4, wherein the information on the external device includes a hardware identifier of the external device.

7. The electronic device of claim 1, wherein the first wireless communication circuit supports magnetic secure transmission (MST), near field communication (NFC) or wireless charging.

8. The electronic device of claim 1, wherein the event includes NFC tagging or recognition of wireless charging.

9. The electronic device of claim 1, wherein the instructions, when executed, cause the processor to perform a sector level sweep (SLS) operation for the second wireless communication connection with the external device.

10. The electronic device of claim 9, wherein the instructions, when executed, cause the processor to fixedly use the beam pattern during the SLS operation.

11. The electronic device of claim 10, wherein the beam pattern which is used is one beam pattern.

12. The electronic device of claim 11, wherein the one beam pattern corresponds to one sector.

13. An electronic device comprising:
a housing;
a touch screen display exposed through the housing;
a battery;
a plurality of antenna elements arranged for beamforming for directional wireless communication;
a first wireless communication circuit configured to provide first wireless communication with a first coverage through the antenna elements;
a second wireless communication circuit configured to provide second wireless communication with a second coverage larger than the first coverage;
a processor disposed inside the housing and operatively connected to the touch screen display, the battery, the first wireless communication circuit and the second wireless communication circuit; and
a memory disposed inside the housing and operatively connected to the processor,
wherein the memory stores instructions that, when executed, cause the processor to:
determine whether an external device is in proximity to the electronic device using the first wireless communication circuit,
enable at least one antenna element which is not all of the plurality of antenna elements, and
transmit data to the external device using the second wireless communication circuit and the enabled at least one antenna element.

14. The electronic device of claim 13, wherein the at least one enabled antenna element provides directional- or non-directional wireless communication.

15. The electronic device of claim 13, wherein the second wireless communication circuit is configured to provide a signal of a frequency from 25 GHz to 100 GHz.

* * * * *